United States Patent
Lee et al.

(10) Patent No.: US 10,347,966 B2
(45) Date of Patent: Jul. 9, 2019

(54) ELECTRONIC DEVICE INCLUDING ANTENNA

(71) Applicant: Samsung Electronics Co., Ltd., Gyeonggi-do (KR)

(72) Inventors: Woosup Lee, Gyeonggi-do (KR); Hyunjeong Lee, Gyeonggi-do (KR); Bumjin Cho, Gyeonggi-do (KR); Hongil Kwon, Gyeonggi-do (KR); Gaeun Lee, Gyeonggi-do (KR); Soyoung Lee, Gyeonggi-do (KR); Changho Lee, Gyeonggi-do (KR); Chihyun Cho, Gyeonggi-do (KR); Jaebong Chun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/817,394

(22) Filed: Nov. 20, 2017

(65) Prior Publication Data

US 2018/0151943 A1    May 31, 2018

(30) Foreign Application Priority Data

Nov. 28, 2016  (KR) .................. 10-2016-0159326

(51) Int. Cl.
*H01Q 1/24* (2006.01)
*H01Q 1/22* (2006.01)
(Continued)

(52) U.S. Cl.
CPC .......... *H01Q 1/2283* (2013.01); *H01Q 1/243* (2013.01); *H01Q 5/35* (2015.01); *H01Q 9/0421* (2013.01);
(Continued)

(58) Field of Classification Search
CPC .. H01Q 1/2283; H01Q 13/106; H01Q 9/0421; H01Q 1/243; H01Q 5/35;
(Continued)

(56) References Cited

U.S. PATENT DOCUMENTS 8,655,422 B2 * 2/2014 Stiehl .................. B29C 45/1676
                                                          361/730
9,236,650 B2 * 1/2016 Kim ........................ H01Q 1/243
(Continued)

FOREIGN PATENT DOCUMENTS

JP          2010-109703 A      5/2010
JP     WO2013-168436 A1       1/2016
(Continued)

OTHER PUBLICATIONS

International Search Report dated Feb. 27, 2018.

*Primary Examiner* — Jean B Jeanglaude
(74) *Attorney, Agent, or Firm* — Cha & Reiter, LLC.

(57) ABSTRACT

An electronic device includes a housing antenna formed from a conductive material. At least parts of a side member and a rear cover that constitute the housing of the electronic device are used as an antenna. Accordingly, radiation patterns generated by this antenna are formed on the rear surface of the electronic device as well as at the upper portion of the electronic device. It is therefore possible to perform wireless communication with higher accuracy.

20 Claims, 25 Drawing Sheets

(51) Int. Cl.
*H05K 5/00* (2006.01)
*H01Q 9/04* (2006.01)
*H01Q 13/10* (2006.01)
*H01Q 5/35* (2015.01)
*H04B 1/3827* (2015.01)
*H04M 1/02* (2006.01)
*H01Q 7/00* (2006.01)

(52) U.S. Cl.
CPC ......... *H01Q 13/106* (2013.01); *H05K 5/0017* (2013.01); *H01Q 7/00* (2013.01); *H04B 1/3827* (2013.01); *H04M 1/0202* (2013.01); *H04M 2250/04* (2013.01)

(58) Field of Classification Search
CPC ... H01Q 7/00; H05K 5/0017; H04M 2250/04; H04M 1/0202; H04B 1/3827
USPC .......................................................... 343/702
See application file for complete search history.

(56) References Cited

U.S. PATENT DOCUMENTS

| | | | |
|---|---|---|---|
| 2012/0313827 A1* | 12/2012 | Kim | ........................ H01Q 1/243 |
| | | | 343/702 |
| 2014/0078008 A1 | 3/2014 | Kang et al. | |
| 2015/0070219 A1* | 3/2015 | Dinh | ........................ H01Q 1/085 |
| | | | 343/702 |
| 2015/0380820 A1 | 12/2015 | Wu et al. | |
| 2016/0049720 A1 | 2/2016 | Hwang et al. | |
| 2016/0064820 A1 | 3/2016 | Kim et al. | |
| 2016/0134730 A1 | 5/2016 | Lee et al. | |

FOREIGN PATENT DOCUMENTS

| | | |
|---|---|---|
| KR | 10-1126854 B1 | 3/2012 |
| KR | 10-2015-0106701 A | 9/2015 |
| KR | 10-2016-0021732 A | 2/2016 |
| KR | 10-1609542 B1 | 4/2016 |
| KR | 10-2016-0056562 A | 5/2016 |

\* cited by examiner

FOR 1ST WIRELESS COMMUNICATION
(2G, 3G, 4G)

FOR 2ND WIRELESS COMMUNICATION
(GPS, WiFi)

ELECTRONIC DEVICE INCLUDING ANTENNA

CLAIM OF PRIORITY

This application claims the benefit under 35 U.S.C. § 119(a) of Korean patent application filed on Nov. 28, 2016 in the Korean Intellectual Property Office and assigned Serial number 10-2016-0159326, the entire disclosure of which is hereby incorporated by reference.

TECHNICAL FIELD

Embodiments in the present disclosure generally relate to an electronic device including a housing having an antenna.

BACKGROUND

Electronic devices such as smart phones include antenna(s) for wireless communication with other electronic devices.

For example, an electronic device may include a variety of antennas such as mobile communication antennas, digital multimedia broadcasting (DMB) antennas, Bluetooth antennas, global positioning system (GPS) antennas, magnetic secure transmission (MST) antennas, and/or near field communication (NFC) antennas.

Further, the housing of the electronic device may include a conductive portion (e.g. a portion of the housing may be metal or another conductive material). The metal housing may protect internal components of the electronic device and also be made to have an aesthetically pleasing exterior. In addition, at least a portion of the metal housing may be utilized as an antenna for the electronic device.

In one example, in the housing of the electronic device, a side frame surrounding a display housed in the housing may be made of metal and may be used as an antenna. An upper portion of the side frame may be used as the antenna. In that case, the radiation pattern of the antenna may be concentrated on the uppermost portion of the electronic device.

However, when the electronic device uses the upper portion of the side frame as the antenna, the performance of the antenna may not be optimal. This is because the radiation efficiency of such an antenna may not be ideal. For example, when the antenna is a NFC antenna, due to poor antenna performance, NFC communication with a NFC tag may be spotty.

SUMMARY

Various embodiments in the present disclosure relate to an electronic device in which at least a part of the side frame or rear cover of the housing is made of a conductive material and utilized as an antenna.

According to one embodiment of the present disclosure, an electronic device may comprise a housing including a first plate, a second plate facing in a reverse direction of the first plate, and a side member surrounding the first and second plates; a touch screen display exposed through the first plate; a processor disposed between the first and second plates; and a wireless communication circuit disposed between the first and second plates and electrically connected to the processor. At least a portion of the second plate may be made of a conductive material. The second plate may have a rectangular shape including a first side having a first length and extending in a first direction; a second side having a second length greater than the first length and extending in a second direction perpendicular to the first direction; a third side having the first length and extending parallel with the first side in the first direction; and a fourth side having the second length and extending parallel with the second side in the second direction. The second plate may include a first slit disposed between the first and third sides and extending in the first direction from a first position on the second side, as viewed in a top view of the second plate; a second slit aligned with the first slit, extending in the first direction from a second position on the fourth side, and spaced apart from the first slit, as viewed in the top view of the second plate; an opening formed in a portion of the second plate between the third side and at least one of the first and second slits, as viewed in the top view of the second plate; a third slit extending from the second slit to the opening, as viewed in the top view of the second plate; and a non-conductive material filling the first slit, the second slit, the third slit, and/or the opening. The side member may include a conductive region extending from the first position to the second position along a portion of the second side, the first side, and a portion of the fourth side; a fourth slit disposed at the first position corresponding to the first slit of the second plate; and a fifth slit disposed at the second position corresponding to the second slit of the second plate.

According to one embodiment of the present disclosure, an electronic device may comprise a housing including a first plate, a second plate facing in a reverse direction of the first plate, and a side member surrounding the first and second plates; a touch screen display exposed through the first plate; a processor disposed between the first and second plates; and a wireless communication circuit disposed between the first and second plates and electrically connected to the processor. At least a portion of the second plate may be made of a conductive material. The second plate may have a rectangular shape including a first side having a first length and extending in a first direction; a second side having a second length greater than the first length and extending in a second direction perpendicular to the first direction; a third side having the first length and extending parallel with the first side in the first direction; and a fourth side having the second length and extending parallel with the second side in the second direction. The second plate may include a first slit disposed between the first and third sides and extending in the first direction from a first position on the second side, as viewed in a top view of the second plate; a second slit aligned with the first slit, extending in the first direction from a second position on the fourth side, and spaced apart from the first slit, as viewed in the top view of the second plate; an opening formed in a portion of the second plate between the first side and at least one of the first and second slits, as viewed in the top view of the second plate; and a non-conductive material filling the first slit, the second slit, and/or the opening. The side member may include a conductive region extending from the first position to the second position along a portion of the second side, the first side, and a portion of the fourth side; a third slit disposed at the first position corresponding to the first slit of the second plate; and a fourth slit disposed at the second position corresponding to the second slit of the second plate.

According to one embodiment of the present disclosure, an electronic device may comprise a housing including a first plate, a second plate facing in a reverse direction of the first plate, and a side member surrounding the first and second plates; a touch screen display exposed through the first plate; a processor disposed between the first and second plates; and a wireless communication circuit disposed between the first and second plates and electrically connected to the processor. At least a portion of the second plate may be made of a conductive material. The second plate may have a rectangular shape including a first side having a first length and extending in a first direction; a second side having a second length greater than the first length and extending in a second direction perpendicular to the first direction; a third side having the first length and extending parallel with the first side in the first direction; and a fourth side having the second length and extending parallel with the second side in the second direction. The second plate may include a conductive region extending between the first and third sides and overlapping a first portion of the second and fourth sides, as viewed in a top view of the second plate; a non-conductive region disposed between a top surface of the side member and a top of the conductive region of the second plate, as viewed in the top view of the second plate; an opening formed in the conductive region; and a slit extending from the non-conductive region to the opening, as viewed in the top view of the second plate. The side member may include a first conductive part extending along the first side of the second plate; a second conductive part extending along the first and second sides of the second plate; a third conductive part extending along the first and fourth sides of the second plate; a first non-conductive part formed between and electrically separating the first and second conductive parts; and a second non-conductive part formed between and electrically separating the first and third conductive parts.

According to one embodiment of the present disclosure, an electronic device may comprise a housing including a first plate, a second plate facing in a reverse direction of the first plate, and a side member surrounding the first and second plates; a touch screen display exposed through the first plate; a processor disposed between the first and second plates; and a wireless communication circuit disposed between the first and second plates and electrically connected to the processor. At least a portion of the second plate may be made of a conductive material. The second plate may have a rectangular shape including a first side having a first length and extending in a first direction; a second side having a second length greater than the first length and extending in a second direction perpendicular to the first direction; a third side having the first length and extending parallel with the first side in the first direction; and a fourth side having the second length and extending parallel with the second side in the second direction. The second plate may include a conductive region; a non-conductive region surrounding the conductive region, as viewed in a top view of the second plate; and an opening formed in the conductive region. The side member may include a first conductive part extending along the first side of the second plate; a second conductive part extending along the first, second and third sides of the second plate; a third conductive part extending along the third side of the second plate; a fourth conductive part extending along the third, fourth and first sides of the second plate; a first non-conductive part formed between and electrically separating the first and second conductive parts; and a second non-conductive part formed between and electrically separating the first and fourth conductive parts.

According to various embodiments of the present disclosure, at least parts of the side frame and the rear cover that constitute the housing of the electronic device are used as antennas. Accordingly, radiation patterns generated by this antenna are formed on the rear surface of the electronic device as well as at the upper portion of the electronic device. It is therefore possible to provide an electronic device capable of performing wireless communication with higher accuracy.

DETAILED DESCRIPTION

Figure 1:
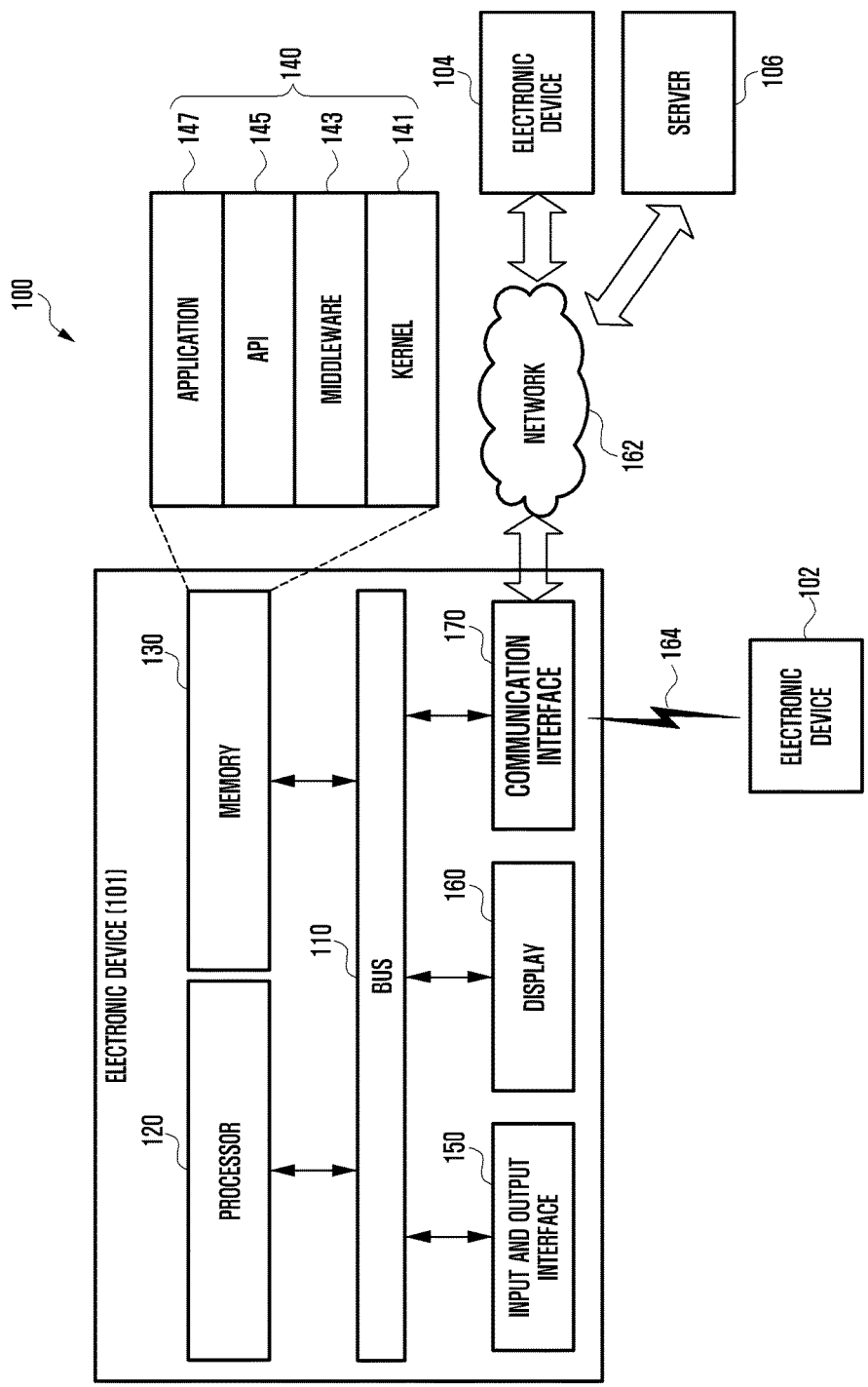
FIG. 1 is a diagram illustrating a network environment including an electronic device according to one embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor) capable of performing a corresponding operation by executing one or more software programs stored in a memory device.

The terms used in describing various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment including an electronic device according to an embodiment of the present disclosure.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an application processor (AP), and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program 140 may include a kernel 141, middleware 143, an application programming interface (API) 145, application programs (or applications) 147, etc. The kernel 141, the middleware 143 or at least part of the API 145 may be called an operating system (OS).

The kernel 141 is capable of controlling or managing system resources (e.g., the bus 110, the processor 120, the memory 130, etc.) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, etc.) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-Electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device For example, the communication interface 170 is capable of communicating with an external device connected to a network 162 via wired or wireless communication.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (Wi-Fi), Bluetooth (BT), near field communication (NFC), magnetic secure transmission (MST), and global navigation satellite system (GNSS). The GNSS may include at least one of GPS, global navigation satellite system (Glonass), Beidou NSS (Beidou), Galileo, the European global satellite-based navigation system, according to GNSS using areas, bandwidths, etc. In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of the following: a telecommunications network, e.g., a computer network (e.g., local area network (LAN) or wide area network (WAN)), the Internet, and a telephone network.

A first external electronic device 102 and a second external electronic device 104 are each identical to or different from the electronic device 101, in terms of type. According to an embodiment, a server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from another electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
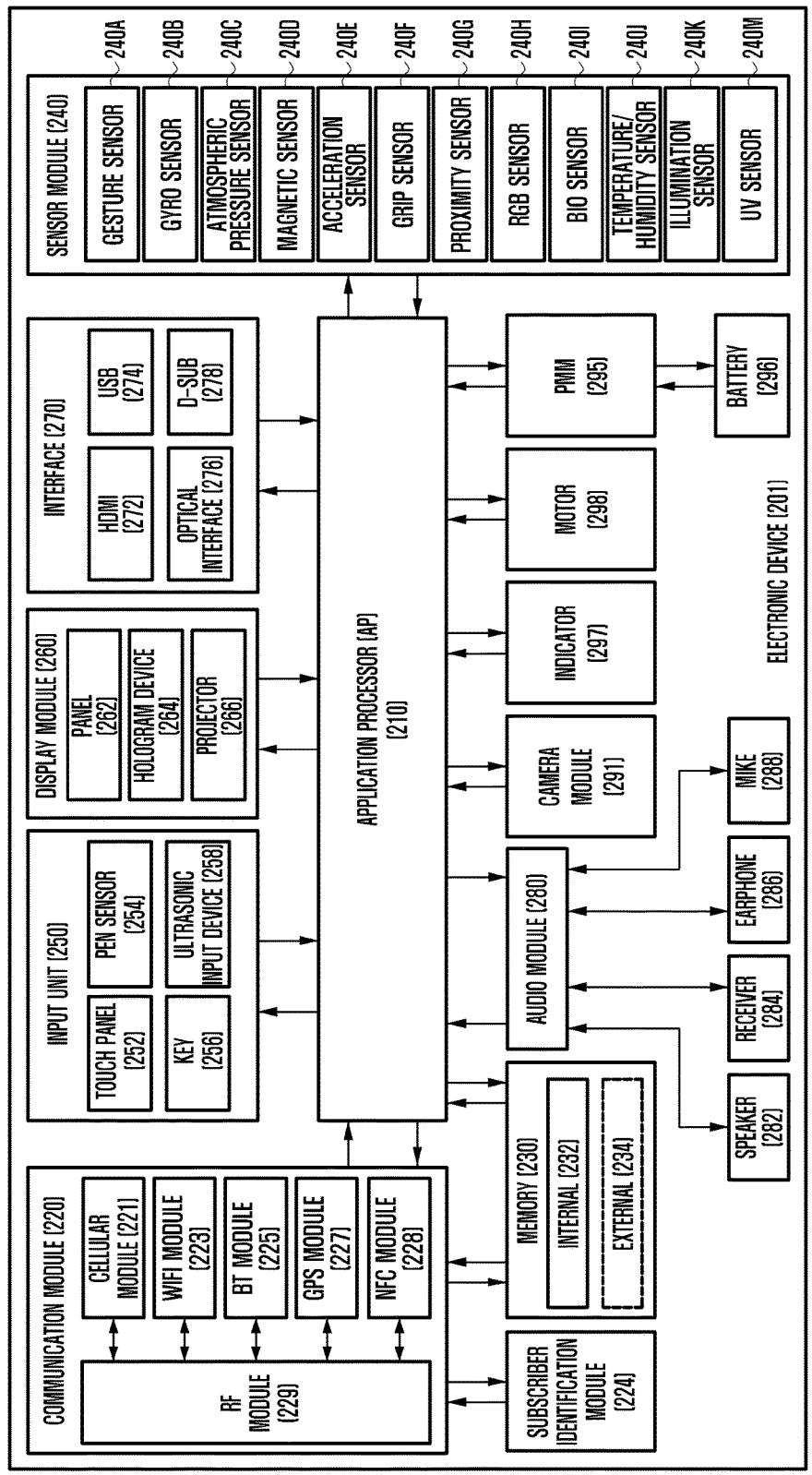
FIG. 2 is a block diagram illustrating an electronic device according to one embodiment of the present disclosure.

FIG. 2 is a block diagram showing a configuration of an electronic device according to an embodiment of the present disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including the cellular module 221, a Wi-Fi module 223, a Bluetooth (BT) module 225, a GPS module 227 (e.g., a GNSS module, Glonass module, Beidou module or Galileo module), an NFC module 228, and a radio frequency (RF) module 229.

The cellular module 221 is capable of providing a voice call, a video call, an SMS service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP.

Each of the Wi-Fi module 223, the BT module 225, the GPS module 227, and the NFC module 228 may include a processor for processing data transmitted or received through the corresponding module. At least part of the cellular module 221, Wi-Fi module 223, BT module 225, GPS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. At least one of the cellular module 221, the Wi-Fi module 223, the BT module 225, the GPS module 227, and the NFC module 228 is capable of transmission/reception of RF signals through a separate RF module.

The memory 230 may include a built-in memory 232 or an external memory 234. The built-in memory 232 is capable of including at least one of a volatile memory, e.g., a dynamic random access memory (DRAM), a static RAM (SRAM), a synchronous dynamic RAM (SDRAM), etc. and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input unit 258. The touch panel 252 may be implemented with at least one of a capacitive touch system, a resistive touch system, an infrared touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278.

The interface 270 may be included in the communication interface 170 shown in FIG. 1. Additionally or alternatively, the interface 270 may include a mobile high-definition link (MHL) interface, a SD card/MMC interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc.

The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296.

The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
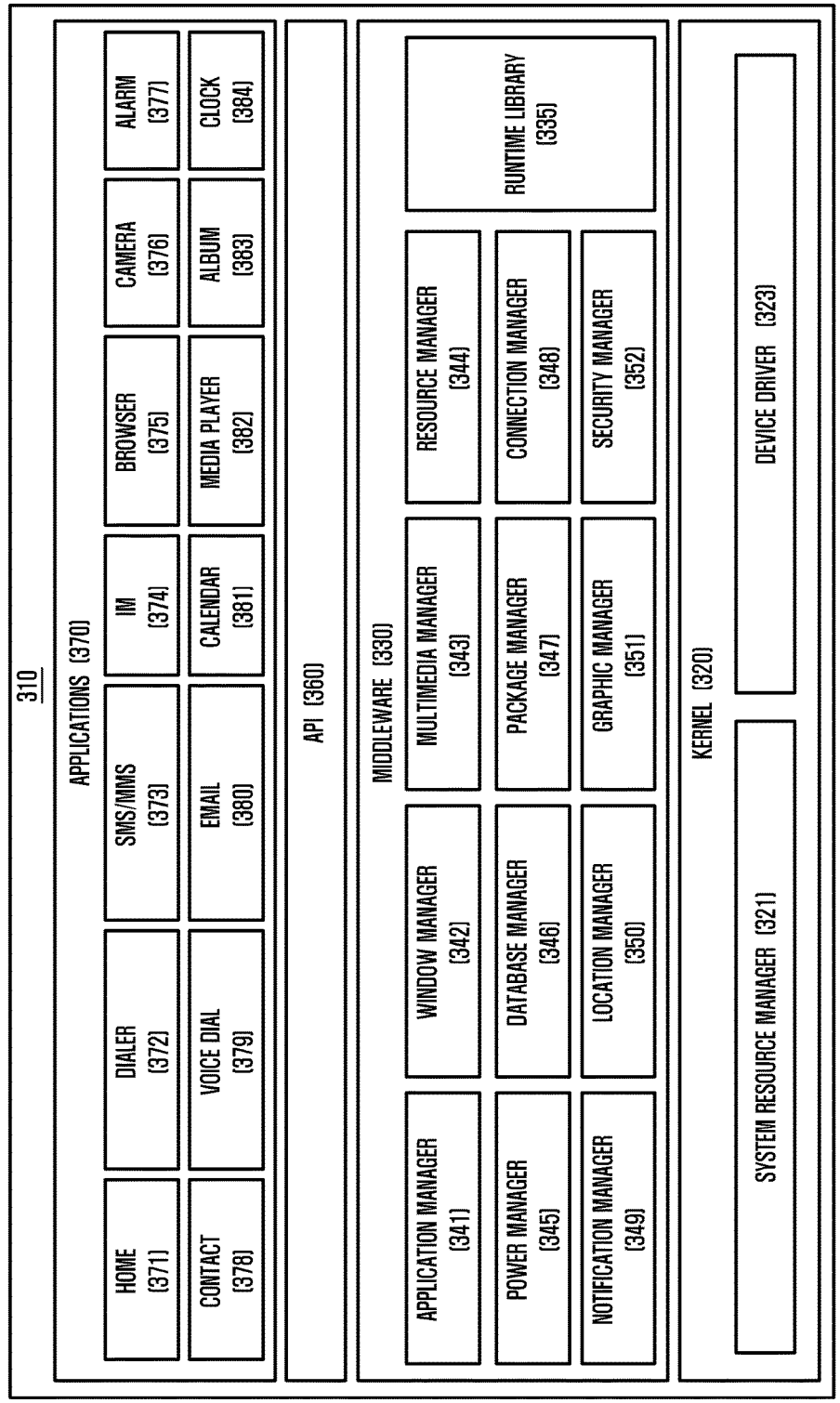
FIG. 3 is a block diagram illustrating a program module according to one embodiment of the present disclosure.

FIG. 3 is a block diagram of a programming module according to an embodiment of the present disclosure.

Referring to FIG. 3, a program module 310 (e.g., program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc.

The program module 310 is capable of including a kernel 320, middleware 330, an API 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a Wi-Fi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, short message service (SMS)/multi-media message service (MMS) 373, instant message (IM) 374, browser 375, camera 376, alarm 377, contact 378, voice dial 379, email 380, calendar 381, media player 382, album 383, and clock 384. Furthermore, although not shown, the applications 370 may also include health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

According to an embodiment, the applications 370 are capable of including an application (e.g., a health care application of a mobile medical device, etc.) having specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4:
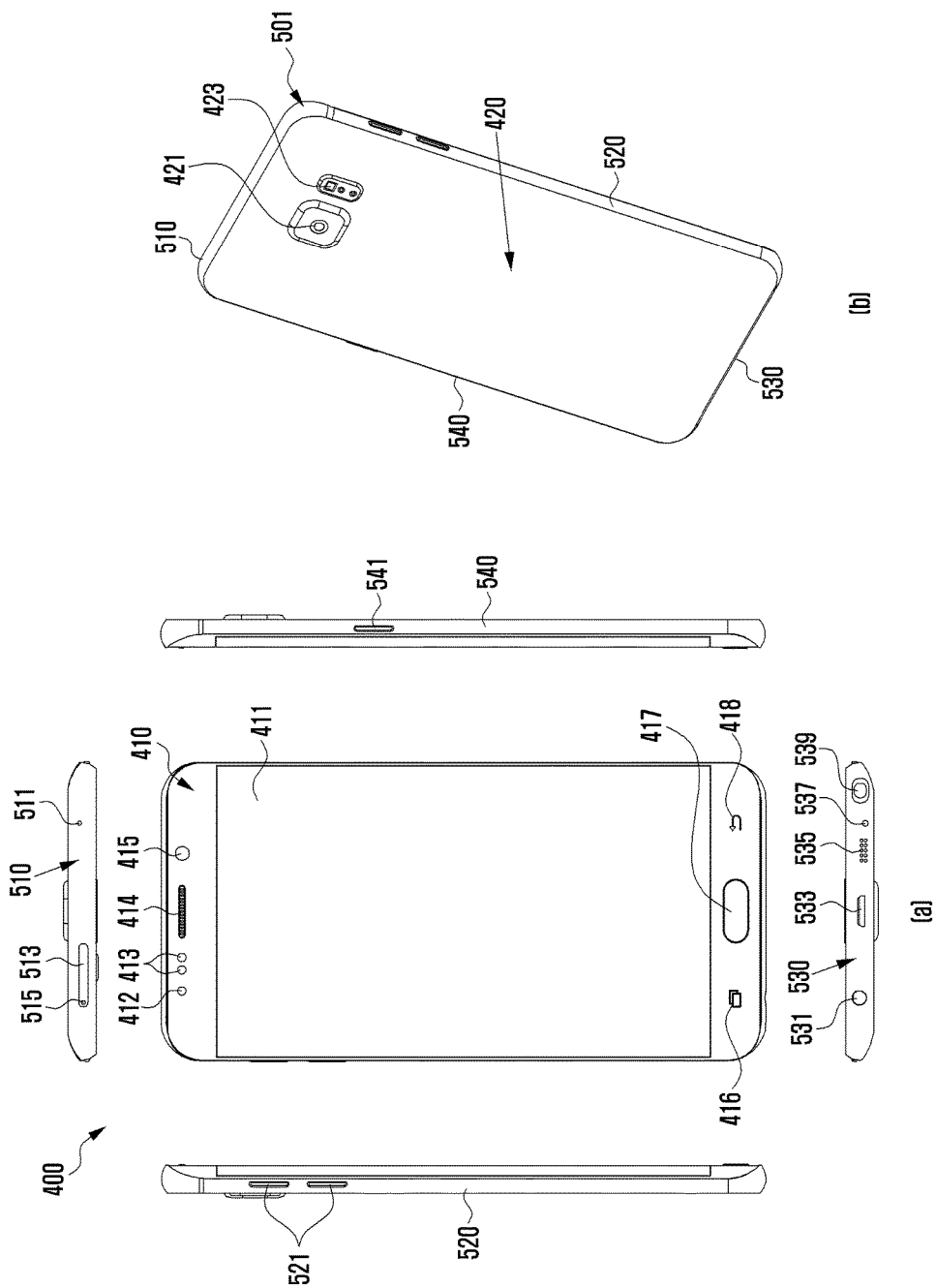
FIG. 4 is a perspective view illustrating an exterior of an electronic device including a housing antenna made of a conductive material according to one embodiment of the present disclosure.

FIG. 4 is a perspective view illustrating the exterior of an electronic device (e.g., 101 in FIG. 1) including a housing antenna made of a conductive material according to one embodiment of the present disclosure. Specifically, part (a) of FIG. 4 illustrates the front surface and four lateral surfaces of the electronic device, and part (b) of FIG. 4 illustrates the rear surface of the electronic device.

As shown in FIG. 4, the electronic device (e.g., 101 in FIG. 1) according to one embodiment may include a housing 400 for protecting various electronic components disposed therein.

The housing 400 may include a first plate 410, a second plate 420 facing in the reverse direction of the first plate 410, and a side member 501 (shown in FIG. 5) that surround the first and second plates 410 and 420.

According to one embodiment, the first plate 410 may include a touch screen display 411, an LED hole 412, a sensor hole 413, a receiver (e.g. speaker) hole 414, a front camera hole 415, a recent app key 416, a home key 417, and a cancel key 418.

The first plate 410 may be the cover that forms the front surface of the electronic device, and the touch screen display 411 may be exposed through a window thereof, so that contents on the touch screen display 411 may be shown to the user.

The touch screen display 411 may display content such as images and texts. Also, the touch screen display 411 may perform touch input functions. Accordingly, the touch screen display 411 may include a touch panel and a display panel.

According to one embodiment, the LED hole 412, the sensor hole 413, the receiver hole 414, and the front camera hole 415 may be disposed in the upper portion of the first plate 410. The LED hole 412 may coincide with an LED disposed within the housing 400. Through the LED hole 412, the LED may output to the user various colored light to indicate the status of the electronic device. For example, the LED may emit red light when the electronic device is charging, emit green light when the charging is finished, and emit blinking blue light when text messages are received.

The sensor hole 413 may comprise one or more sensor holes. The sensor hole 413 may coincide with sensors disposed within the housing 400 that (1) measure or detect various physical quantities or operation states of the electronic device, and then (2) convert the measured or detected information into electric signals. For example, the sensor may include gesture sensors, proximity sensors, grip sensors, gyro sensors, acceleration sensors, geomagnetic sensors, atmospheric pressure sensors, temperature/humidity sensors, Hall-effect sensors, red/green/blue (RGB) light sensors, illuminance sensors, biometric sensors, ultraviolet (UV) sensors, etc.

The receiver hole 414 may transmit sounds outputted from an audio unit such as a speaker disposed within the housing 400. In alternative embodiments not shown in FIG. 4, the receiver hole 414 may also be disposed on the first lateral surface 510, the second lateral surface 520, and/or the second plate 420 of the electronic device.

The front camera hole 415 may coincide with a camera disposed within the housing 400. The camera may be configured to capture images or videos in front of the electronic device.

According to one embodiment, at least one of the recent app key 416, the home key 417, and the cancel key 418 may be disposed in the lower portion of the first plate 410 of the electronic device. Such keys may be physical buttons or touch keys. The recent app key 416 may be used to display a list of apps (or applications) recently executed by the user or to execute a split screen view. The home key 417 may be used to unlock the electronic device or to display the home screen. The cancel key 418 may be used to return to the previous screen or to execute a menu shown on the current screen.

The second plate 420 may be mostly made from a conductive material. The second plate 420 may be the cover that forms the rear surface of the electronic device. The second plate 420 may include holes where a rear camera 421 and a flash 423 are disposed. The rear camera 421 may capture images or videos behind the electronic device, and may include one or more image sensors and an image signal processor (ISP). The flash 423 may be disposed on one side of the rear camera 421 to emit additional light for image capture by the rear camera 421.

According to one embodiment, the side member 501 of the electronic device may include the first lateral surface 510, the second lateral surface 520, the third lateral surface 530, and the fourth lateral surface 540.

The first lateral surface 510 may form the upper lateral surface of the electronic device. The first lateral surface 510 may include, for example, a first microphone hole 511, a tray 513, and a tray draw-out hole 515. The first microphone hole 511 may coincide with a microphone disposed within the housing 400. The microphone may be configured to convert the user's voice input into an electric signal to be used input to the electronic device. The tray 513 may receive a SIM card and/or a memory card. The tray 513 may cooperate with a socket disposed within in the electronic device. The tray draw-out hole 515 may be used to pull out the tray 513 from the electronic device when a tray separating pin is inserted into the tray draw-out hole 515.

The second lateral surface 520 may form the left lateral surface of the electronic device. The second lateral surface 520 may house, for example, a volume control button 521. The volume control button 521 may be used to adjust the volume of the audio output from the electronic device.

The third lateral surface 530 may form the lower lateral surface of the electronic device. The third lateral surface 530 may include a jack hole 531, a port 533, a speaker hole 535, a second microphone hole 537, and a pen insertion hole 539. The jack hole 531 may accommodate the plugs of, for example, earphones, earset, or headsets. The port 533 may be the interface unit for electrical connection with another electronic device. For example, the port 533 may support high-definition multimedia interface (HDMI), universal serial bus (USB), D-subminiature (D-sub) cables, etc. The speaker hole 535 may coincide with a speaker disposed within the housing 400 and permit the transmission of audio output from the speaker. The second microphone hole 537 may coincide with a second microphone disposed within the housing 400. The second microphone may be configured to convert the user's voice input into an electric signal to be used as input to the electronic device. The pen insertion hole 539 may accommodate a touch pen to be used for entering inputs onto the touch screen display.

According to one embodiment, the fourth lateral surface 540 may form the right lateral surface of the electronic device. The fourth lateral surface 540 may house, for example, a power on/off button 541. The power on/off button 541 may turn the power of the electronic device on or off.

Figure 5:
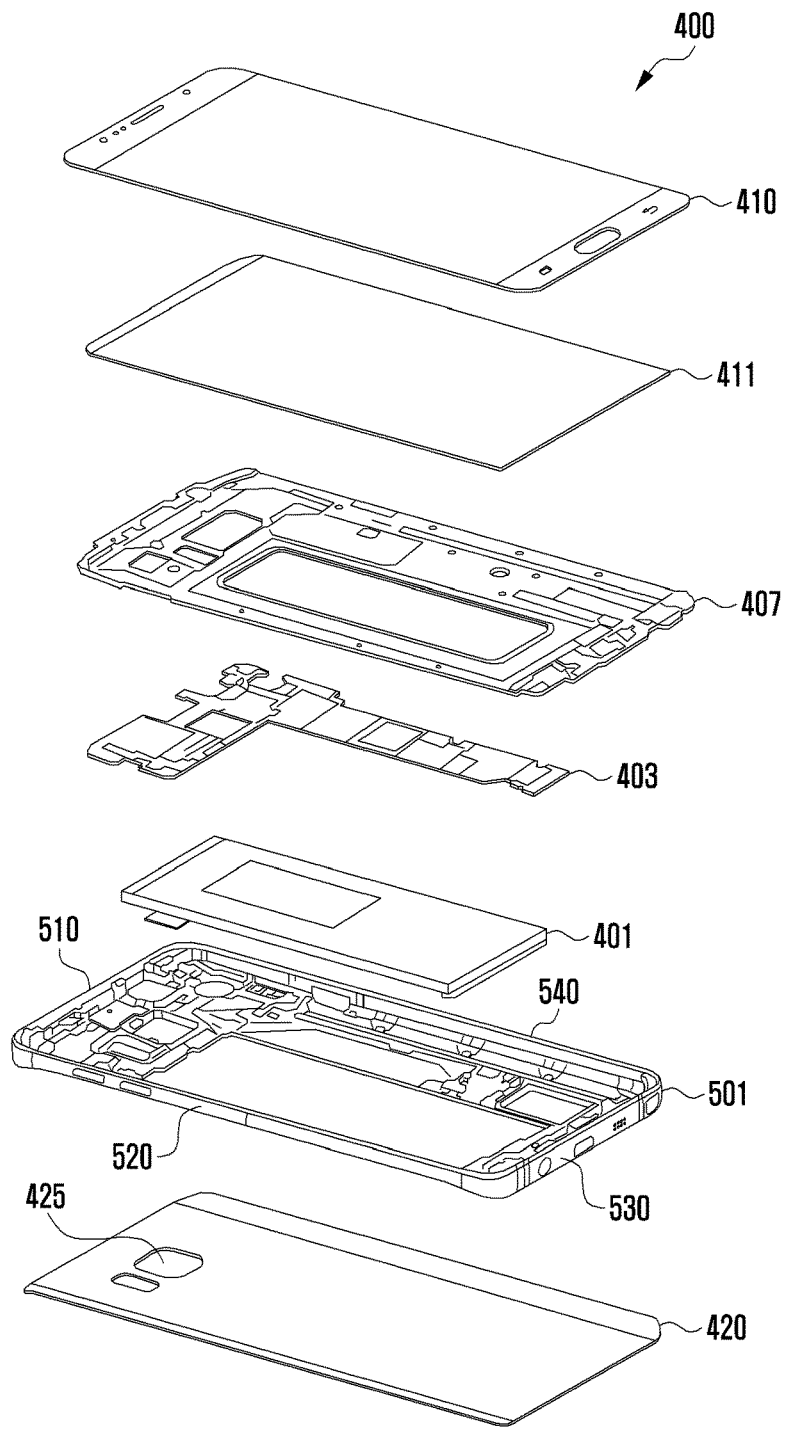
FIG. 5 is an exploded perspective view schematically illustrating elements of an electronic device according to one embodiment of the present disclosure.

FIG. 5 is an exploded perspective view schematically illustrating elements of an electronic device according to one embodiment of the present disclosure.

As shown in FIG. 5, the electronic device according to one embodiment may include the side member 501, a battery 401, a printed board assembly (PBA) 403, an inner frame 407, the first plate 410, the touch screen display 411, and the second plate 420.

According to one embodiment, the side member 501 may include the first lateral surface 510, the second lateral surface 520, the third lateral surface 530 and the fourth lateral surface 540. The side member 501 together with the first and second plates 410 and 420 form the housing 400 where various components such as the battery 401, the PBA 403, the inner frame 407, and the touch screen display 411 may be disposed therein. The battery 401 may supply power necessary for driving the electronic device. On the PBA 403, various components required for the operations of the electronic device are mounted. These components may include a processor (e.g., the processor 210 in FIG. 2), a memory (e.g., the memory 230 in FIG. 2), a communication interface (e.g., the communication module 229 in FIG. 2), an NFC module (e.g., the NFC module 228 in FIG. 2), and various sensors (e.g., the sensor module 240 in FIG. 2). The PBA 403 may include a printed circuit board (PCB) and a flexible PCB (FPCB), both of which have various contacts suitable for the mounting of the above-mentioned components. The communication interface may be a wireless communication circuit of the electronic device and may be electrically connected to the processor. The inner frame 407 may be a bracket, the inclusion of which allows the electronic device to be thinner and more durable. The inner frame 407 may be substantially rigid so as to protect the components disposed within the housing 400 from external impact.

The touch screen display 411 may be a liquid crystal display (LCD), an organic light emitting diode (OLED), an active matrix OLED (AMOLED), a flexible display, or the like. The first plate 410 may be disposed on the touch screen display 411.

Figure 6:
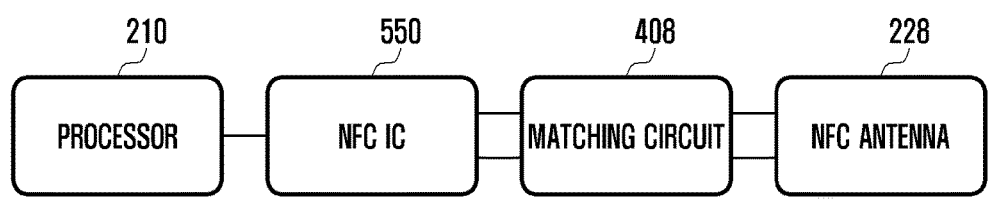
FIG. 6 is a block diagram illustrating a connection relationship between some elements of an electronic device according to one embodiment of the present disclosure.

FIG. 6 is a block diagram illustrating a connection relationship between some elements of an electronic device according to one embodiment of the present disclosure.

As shown in FIG. 6, the electronic device according to one embodiment may include a processor (e.g., the processor 210 in FIG. 2), an NFC IC 550 (e.g., the NFC module 228 in FIG. 2), a matching circuit 408, and an NFC antenna (e.g., the NFC module 228 in FIG. 2).

According to one embodiment, the NFC IC 550 may be a wireless communication circuit capable of communicating with another electronic device capable of NFC communication, and the NFC antenna 228 may be the antenna radiator used in the NFC communication.

The processor 210 may perform the required operations or data processing for the operation of the electronic device (e.g., 101 in FIG. 1). According to one embodiment, the processor 210 may control the NFC IC 550, the matching circuit 408, and the NFC antenna 228 to enable NFC communication.

The NFC IC 550 may be electrically coupled to a feeding point (e.g., the first point p1 and the second point p2 described below) in the electronic device to provide a radio frequency (RF) signal.

The matching circuit 408 may electrically couple the NFC IC 550 and the NFC antenna 228. The matching circuit 408 may adjust impedance or frequency for the NFC IC 550. The matching circuit 408 may include, for example, at least one filter circuit. According to one embodiment, the filter circuit included in the matching circuit 408 may block signal components of frequencies other than the operating frequency (e.g., approximately 13.56 MHz) of NFC communication, so that the NFC IC 550 does not interfere with long-distance wireless communication that also uses the side member 501 as the antenna radiator.

The NFC antenna 228 may transmit and receive radio waves for NFC communication with external devices. In doing so, the NFC antenna 228 may generate and receive magnetic fields. The NFC antenna 228 may be configured as a coil.

According to one embodiment, the processor 210, the NFC IC 550, and the matching circuit 408 may be disposed on the PBA 403 described above in FIG. 5. The NFC IC 550, the matching circuit 408, and the NFC antenna 228 may be connected to each other through two feeding points including positive and negative terminals.

Figure 7:
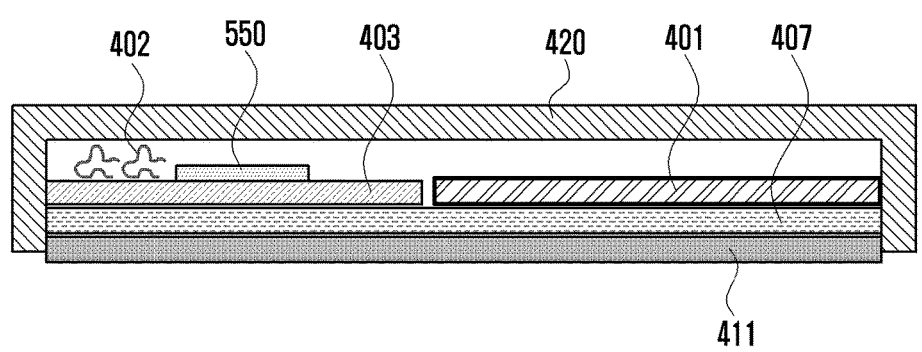
FIG. 7 is a diagram illustrating an arrangement relationship of some elements of an electronic device according to one embodiment of the present disclosure.

FIG. 7 is a diagram illustrating an arrangement relationship of some elements of an electronic device according to one embodiment of the present disclosure.

As shown in FIG. 7, the electronic device according to one embodiment may include the second plate 420, a power feeder 402, the NFC IC 550, the PBA 403, the battery 401, the inner frame 407, and the touch screen display 411.

The feeder 402 may connect the second plate 420 and the matching circuit 408 shown in FIG. 6. The power feeder 402 may include, for example, a C-clip.

Figure 8:
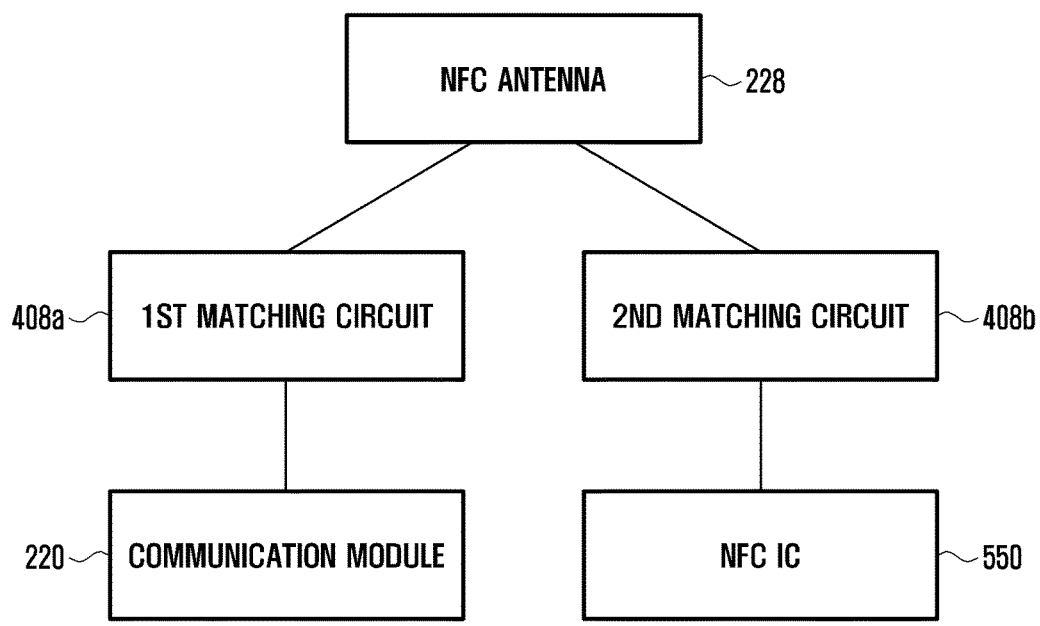
FIG. 8 and FIG. 9 are block diagrams illustrating a connection relationship of some elements of an electronic device according to two embodiments of the present disclosure.

FIG. 8 is a block diagram illustrating a connection relationship of some elements of an electronic device according to one embodiment of the present disclosure.

As shown in FIG. 8, the electronic device according to one embodiment may include the NFC antenna 228, a first matching circuit 408*a*, a second matching circuit 408*b*, the communication module 220, and the NFC IC 550.

According to one embodiment, the communication module 220 may be a first wireless communication circuit, and the NFC IC 550 may be a second wireless communication circuit. For example, the communication module 220 may support another communication protocol that is not NFC.

The second plate 420 and/or the side member 501 shown in FIG. 4 may operate as the NFC antenna 228 for communication.

When the second plate 420 and/or the side member 501 are used as the antenna radiator, they may be used for both long-distance communication (e.g., 2G, 3G, 4G, etc.) and short-range communication (e.g., NFC, MST, etc.). In this case, the NFC 228 antenna may be used for both long-distance and short-range communication.

Accordingly, the NFC antenna 228 may be connected to the communication module 220 for long-distance communication (e.g., 2G, 3G, 4G, etc.) through the first matching circuit 408*a*.

The first matching circuit 408*a* may include a high pass filter.

At the same time, the NFC antenna 228 may be connected to the NFC IC 550 for short-range communication (e.g., NFC, MST, etc.) through the second matching circuit 408*b*. The second matching circuit 408*b* may include a low pass filter.

Therefore, the NFC antenna 228 may be used as both the long-distance communication antenna and the short-range communication antenna through the use of the first matching circuit 408*a* or the second matching circuit 408*b*.

Figure 9:
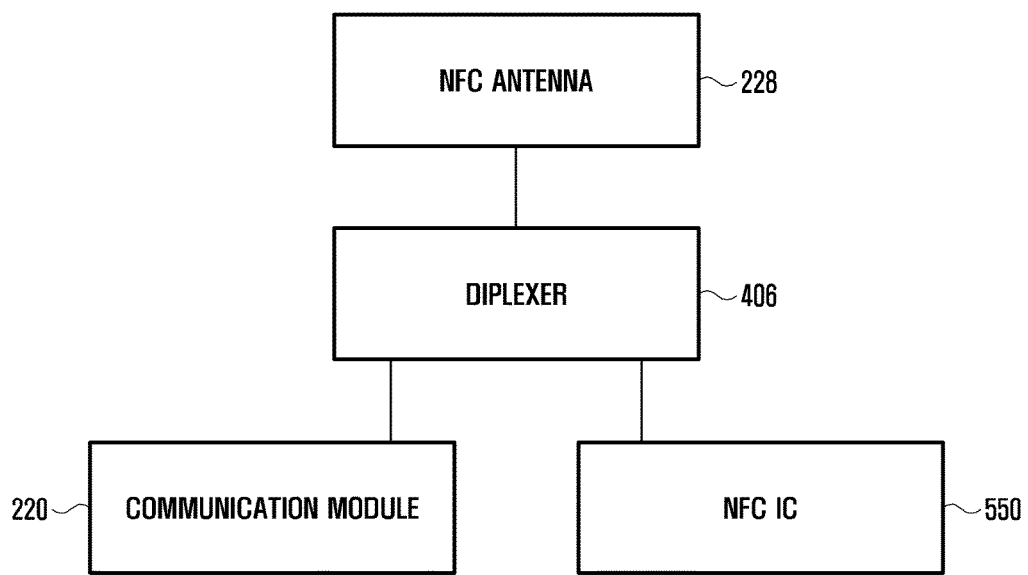

FIG. 9 is a block diagram illustrating a connection relationship of some elements of an electronic device according to one embodiment of the present disclosure.

As shown in FIG. 9, the electronic device according to one embodiment may include the NFC antenna 228, a diplexer 406, the communication module 220, and the NFC IC 550.

According to one embodiment, the communication module 220 may be the first wireless communication circuit, and the NFC IC 550 may be the second wireless communication circuit. For example, the communication module 220 may support another communication protocol that is not NFC.

The NFC antenna 228 may include at least a portion of the second plate 420 and/or the side member 501 shown in FIG. 5. The NFC antenna 228 may be connected to the communication module 220 and the NFC IC 550 through the diplexer 406.

According to one embodiment, the diplexer 406 may deliver signals separately outputted from the communication module 220 and the NFC IC 550 to the NFC antenna 228 without interference. The diplexer 406 may operate as a low-pass filter (LBF) for signals from the NFC IC 550 and a high-pass filter (HBF) for signals from the communication module 220.

Figure 10:
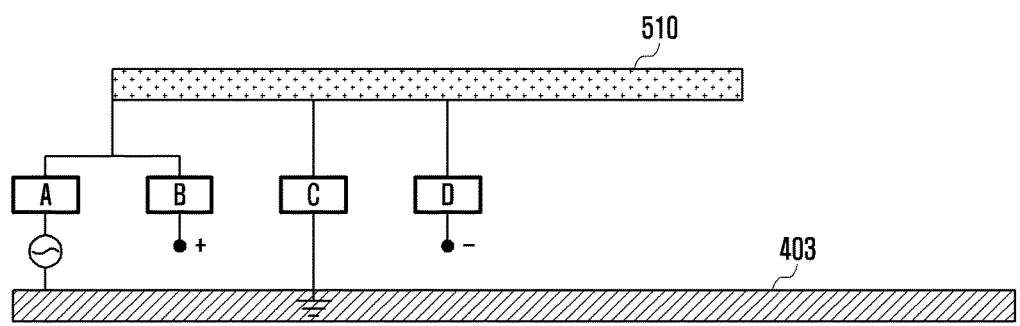
FIG. 10 is a diagram illustrating some elements of an antenna of an electronic device according to one embodiment of the present disclosure.

FIG. 10 is a diagram illustrating some elements of an antenna of an electronic device according to one embodiment of the present disclosure.

As shown in FIG. 10, the electronic device according to one embodiment may use one portion of the first lateral surface 510 of the side member 501 shown in FIG. 5 as an antenna radiator for long-distance communication (e.g., 2G, 3G, 4G, etc.), and also use another portion of the first lateral surface 510 as an antenna radiator for short-range communication (e.g., NFC, MST, etc.).

According to one embodiment, at least one filter (e.g., A, B, C, D) may be disposed between the first lateral surface 510 and the PBA 403. For example, a first band-pass filter (A) for long-distance communication may be connected between the first lateral surface 510 and the PBA 403. The first band-pass filter (A) may include a capacitor.

At least a portion of the first lateral surface 510 may be connected to, for example, the positive terminal of the power feeder so as to operate as an antenna radiator for short-range communication. A second band-pass filter (B) for short-range communication may be connected between the first lateral surface 510 and the positive terminal. The second band-pass filter (B) may pass low-frequency band signals and block high-frequency band signals. The second band-pass filter (B) may include an inductor.

A third filter (C) for blocking low-band frequencies may be connected between the first lateral surface 510 and the PBA 403. Also, the first lateral surface 510 may be connected to the negative terminal of the power feeder via a fourth filter (D) for blocking high-band frequencies.

Figure 11:
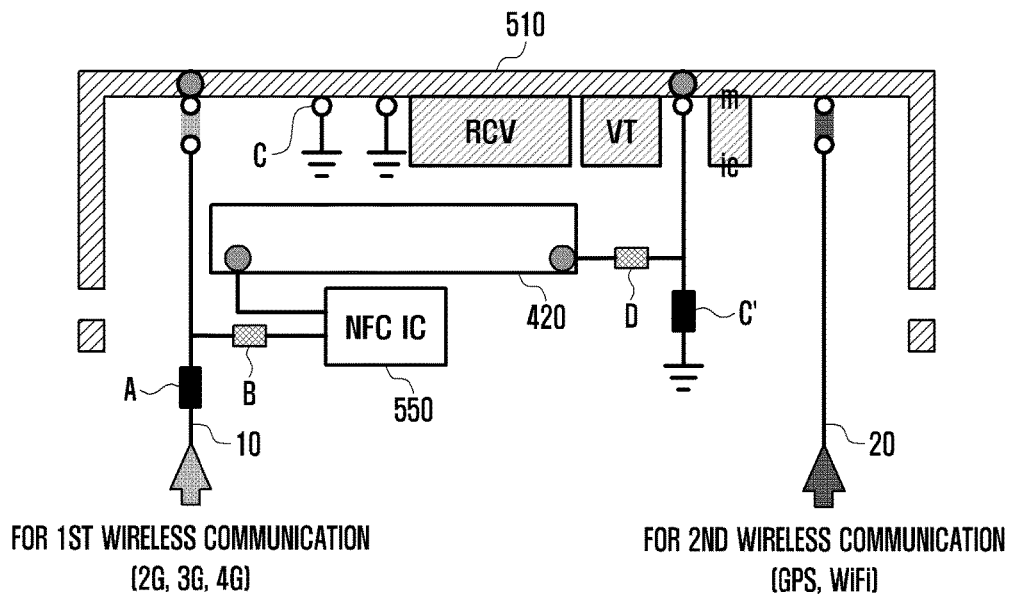
FIG. 11 and FIG. 12 are diagrams illustrating an antenna of an electronic device according to one embodiment of the present disclosure.
Figure 12:
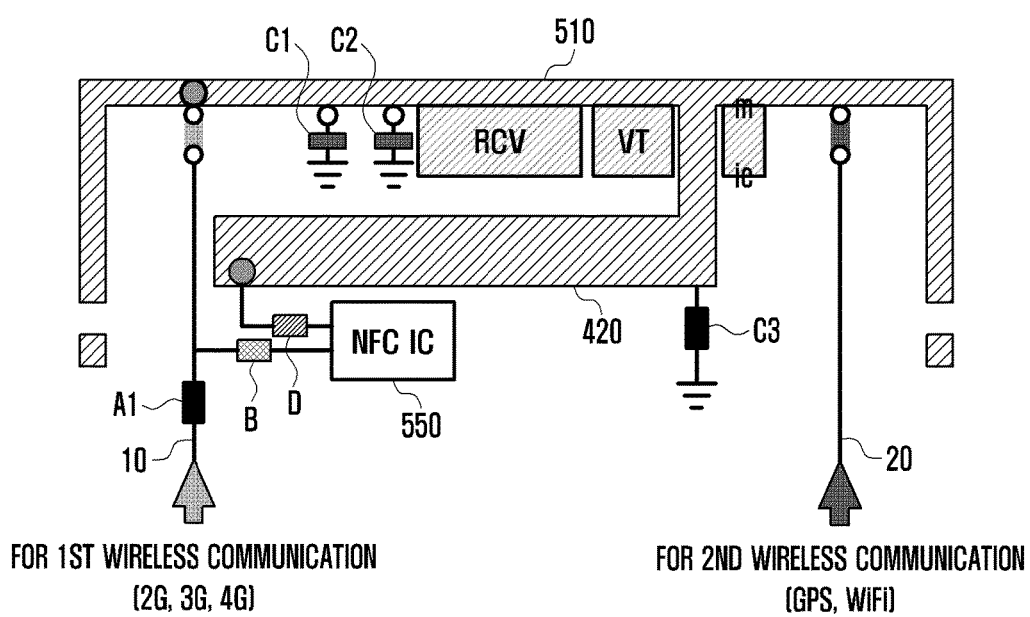

FIGS. 11 and 12 are diagrams illustrating an antenna of an electronic device according to one embodiment of the present disclosure.

As shown in FIG. 11, the electronic device according to one embodiment may use at least a portion of the first lateral surface 510 of the side member 501 as an antenna radiator for a first wireless communication (e.g., 2G, 3G, 4G, etc.), and also use at least another portion of the first lateral surface 510 as an antenna radiator for a second wireless communication (e.g., GPS, WiFi, etc.).

According to one embodiment, the first lateral surface 510 and the second plate 420 may be connected to each other via the fourth filter (D) (e.g., an inductor).

A first wireless communication signal line 10 may be connected to the first filter (A). The first filter (A) may include a capacitor. The first lateral surface 510 and the NFC IC 550 may be connected to each other through the second filter (B). The second filter (B) may include an inductor. The first lateral surface 510 may be connected to the third filter (C) that blocks low-band frequencies. The first lateral surface 510 may be further connected to another third filter (C') that blocks low-band frequencies. A second wireless communication signal line 20 may be connected to the first lateral surface 510.

As shown in FIG. 12, the electronic device according to another embodiment may use at least a portion of the first lateral surface 510 of the side member 501 as an antenna radiator for the first wireless communication (e.g., 2G, 3G, 4G, etc.), and also use at least another portion of the first lateral surface 510 as an antenna radiator for the second wireless communication (e.g. GPS, WiFi, etc.).

According to one embodiment, the second plate 420 connected to the first lateral surface 510 may be connected to the NFC IC 550 via the fourth filter (D). The fourth filter (D) may include, for example, an inductor.

The first wireless communication signal line 10 may be connected to the first filter (A1). The first filter (A1) may include a capacitor. The first lateral surface 510 may be connected to at least one third filter (C1, C2) that blocks low-band frequencies. The second plate 420 may be further connected to another third filter (C3) that blocks low-band frequencies. The second wireless communication signal line 20 may be connected to the first lateral surface 510.

The first lateral surface 510 and the NFC IC 550 may be connected to each other via the second filter (B). The second filter (B) may include an inductor. The second filter (B) or the fourth filter (D) may use inductors, which are devices for cutting off high-band frequencies, to block signals for long-distance communication and also transmit/receive signals for low-band, short-range communication.

Figure 13:
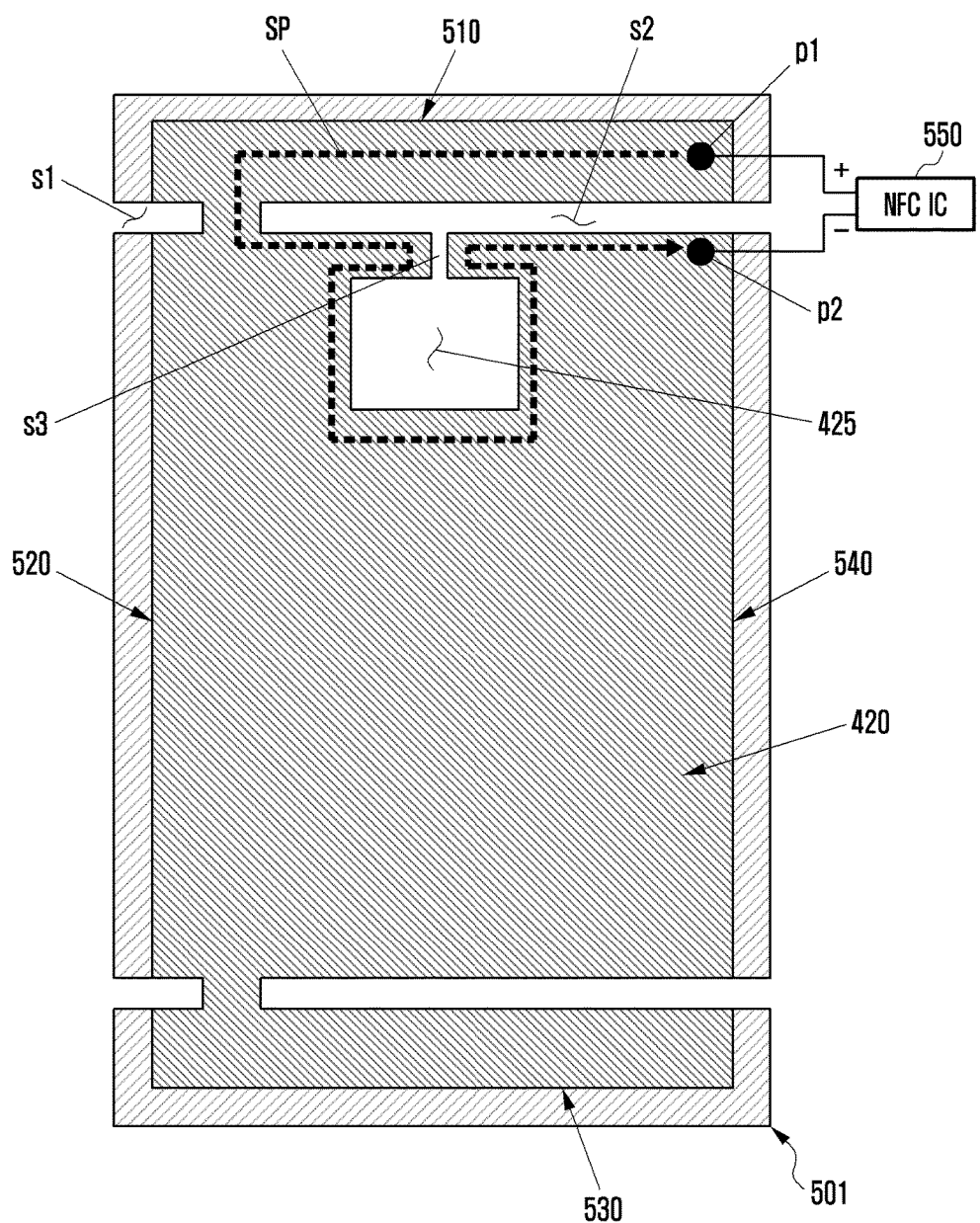
FIG. 13 is a diagram illustrating an electronic device including a housing antenna formed from a conductive material according to one embodiment of the present disclosure.

FIG. 13 is a diagram illustrating an electronic device including a housing antenna formed from a conductive material according to one embodiment of the present disclosure.

As shown in FIG. 13, the electronic device according to one embodiment may include the second plate 420 and the side member 501 having the first lateral surface 510, the second lateral surface 520, the third lateral surface 530, and the fourth lateral surfaces 540.

According to one embodiment, portions of the second plate 420 and the side member 501 may be made of a conductive material such as a metal. Accordingly, portions of the second plate 420 and the side member 501 may operate as antenna(s) for wireless communication. For example, the conductive material for the second plate 420 and the side member 501 may be copper (Cu), aluminum (Al), iron (Fe), titanium (Ti), silver (Ag), palladium (Pd), platinum (Pt), gold (Au), nickel (Ni), etc. The antenna using a portion of the second plate 420 and a portion of the side member 501 may operate in a specific frequency band (e.g., approximately 13.56 MHz) used in wireless communication in a certain protocol (e.g., NFC). Alternatively, the antenna may operate in approximately 700 MHz or more for long-distance wireless communication (e.g., LTE communication, WCDMA communication, WLAN communication, GPS communication, Bluetooth communication, etc.).

The second plate 420 may have a substantially rectangular shape. As explained above, the second plate 420 may form the rear surface of the electronic device. The second plate 420 may have a rectangular shape that includes a first side having a certain length (e.g., the first length) and extending in the first direction (e.g., widthwise), a second side having another length (e.g., the second length) greater than the first length and extending in the second direction (e.g., lengthwise) perpendicular to the first direction, a third side having the same length (e.g., the first length) as that of the first side and extending parallel with the first side in the first direction, and a fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501. In a top view as shown in FIG. 13, the second plate 420 may include the first slit s1 that is disposed between the first side and the third side extending widthwise from a certain position (e.g., the first position) on the second side. The second lateral surface 520 of the side member 501 may include a slit corresponding to the first slit s1. In addition, the second plate 420 may include the second slit s2 that is aligned with the first slit s1. The second slit s2 may extend in the first direction to a certain position (e.g., the second position) on the fourth side. The second slit s2 may not be connected to the first slit s1, thereby providing a space between the slits s1 and s2, as shown in FIG. 13. The fourth lateral surface 540 of the side member 501 may include a slit corresponding to the second slit s2. The first slit s1 and the second slit s2 may be separated from each other by a portion of the second plate 420. Further, the second plate 420 may include an opening 425 formed in a portion of the second plate 420 between the third side and at least one of the first and second slits s1 and s2. For example, the opening 425 may accommodate the rear camera 421 as shown in FIG. 4. As shown in FIG. 13, the second plate 420 may also include a third slit s3 that extends from the second slit s2 to the opening 425.

According to one embodiment, the second plate 420 may have non-conductive materials filling the first slit s1, the second slit s2, the third slit s3, and/or the opening 425. For example, the non-conductive material may be an insulator (or dielectric) such as polyimide, plastic, polymer, ceramic, glass, or the like.

The side member 501 may include a conductive region defined by the slits s1 and s2 that includes an upper portion of the second lateral surface 520, the first lateral surface 510, and an upper portion of the fourth lateral surface 540. For example, the conductive region may be a portion of the side member 501 that extends from the first position to the second position. The conductive region may be separated from the rest of the side member 501 by the non-conductive materials that fill the slits s1 and s2.

A first point p1 (e.g., a first contact) may be adjacent to the fourth lateral surface 540 and between the first lateral surface 510 of the side member 501 and the second slit s2. In addition, a second point p2 (e.g., a second contact) may be adjacent to the fourth lateral surface 540 and between the third lateral surface 530 of the side member 501 and the second slit s2.

The NFC IC 550 may be electrically connected to the first point p1 and the second point p2. A signal path SP (e.g., a current path) may be formed from the first point p1 to the second point p2. For example, the signal path SP is shown in dashed line in FIG. 13 and extends from the first point p1, through a portion of the second plate 420 between the first and second slits s1 and s2, around the circumference of the opening 425, and to the second point p2. The signal path SP may operate as a loop antenna for NFC communication. For example, the NFC IC 550 may be electrically coupled to the first point p1 and the second point p2 to provide RF signals (e.g., power feed). The second plate 420 operates as an antenna for wireless communication together with a portion of the side member 501, so additional separate NFC antennas are not required.

According to one embodiment, the NFC IC 550 may be connected to the first and second points p1 and p2 via an inductor having high inductance, so that the signal path can operate in the high frequency band. Doing so prevents interference with other high-frequency communication (e.g., LTE, etc.). Alternatively, the second plate 420 may include one or more inductors on the signal path SP. The second plate 420 may further include, for example, at least one low-pass filter on the signal path SP. Inductors or low-pass filters included on the signal path SP may block signal components of frequencies other than the operating frequency of short-range communication (e.g., approximately 13.56 MHz). Therefore, interference with other long-distance wireless communication may be prevented.

Figure 14:
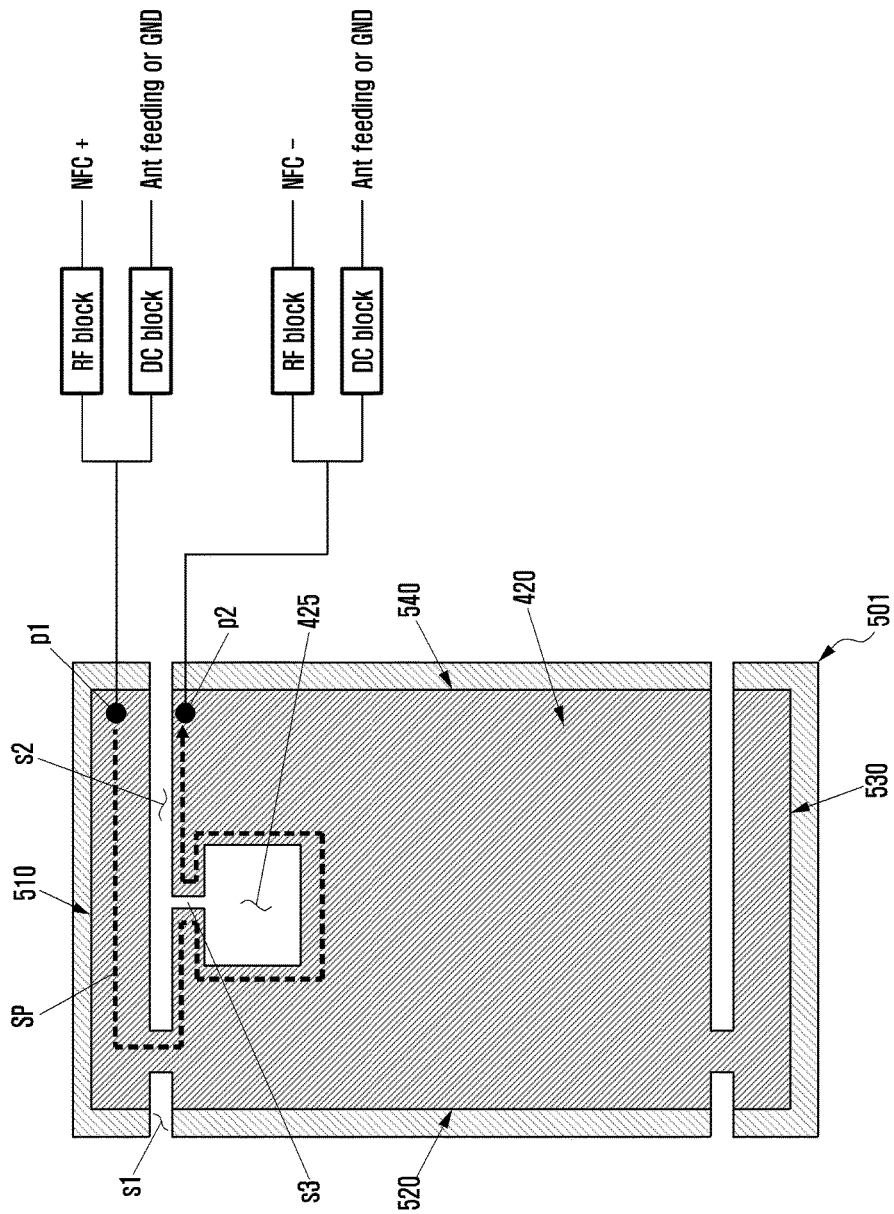
FIG. 14 and FIG. 15 are diagrams illustrating an electronic device including a housing antenna formed from a conductive material according to two embodiments of the present disclosure.

FIG. 14 is a diagram illustrating an electronic device including a housing antenna formed from a conductive material according to one embodiment of the present disclosure. In the following description regarding FIG. 14, the same parts as those of FIG. 13 described above may not be described in detail.

As shown in FIG. 14, according to one embodiment, the first point p1 (e.g., the first contact) may be adjacent to the fourth lateral surface 540 and between the first lateral surface 510 of the side member 501 and the second slit s2. In addition, the second point p2 (e.g., the second contact) may be adjacent to the fourth lateral surface 540 and between the third lateral surface 530 of the side member 501 and the second slit s2.

According to one embodiment, the first point p1 may be connected to the positive terminal via an RF block. In addition, the first point p1 may be connected to an antenna feeding unit or a ground GND via a DC block.

The second point p2 may be connected to the negative terminal via another RF block. Also, the second point p2 may be connected to the antenna feeding unit or the ground GND via another DC block.

Figure 15:
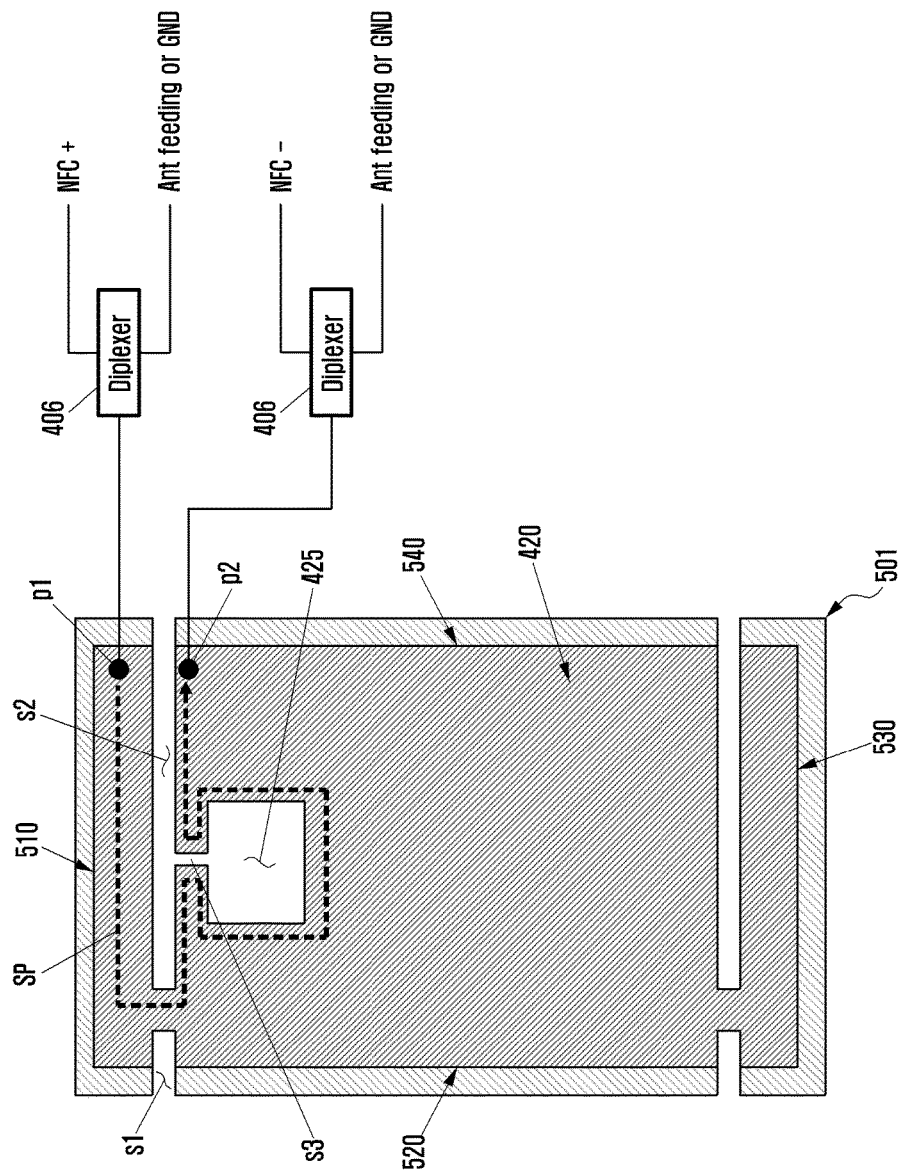

FIG. 15 is a diagram illustrating an electronic device including a housing antenna formed from a conductive material according to one embodiment of the present disclosure.

In the following description regarding FIG. 15, the same parts as those of FIG. 13 described above may not be described in detail.

As shown in FIG. 15, according to one embodiment, the first point p1 (e.g., the first contact) may be adjacent to the fourth lateral surface 540 and between the first lateral surface 510 of the side member 501 and the second slit s2. In addition, the second point p2 (e.g., the second contact) may be adjacent to the fourth lateral surface 540 and between the third lateral surface 530 of the side member 501 and the second slit s2.

According to one embodiment, the first point p1 may be connected to a diplexer 406. The diplexer 406 may be connected to the positive terminal and also connected to an antenna feeding unit or a ground GND.

The second point p2 may be connected to another diplexer 406. This diplexer 406 may be connected to the negative terminal and also connected to the antenna feeding unit or the ground GND.

Figure 16:
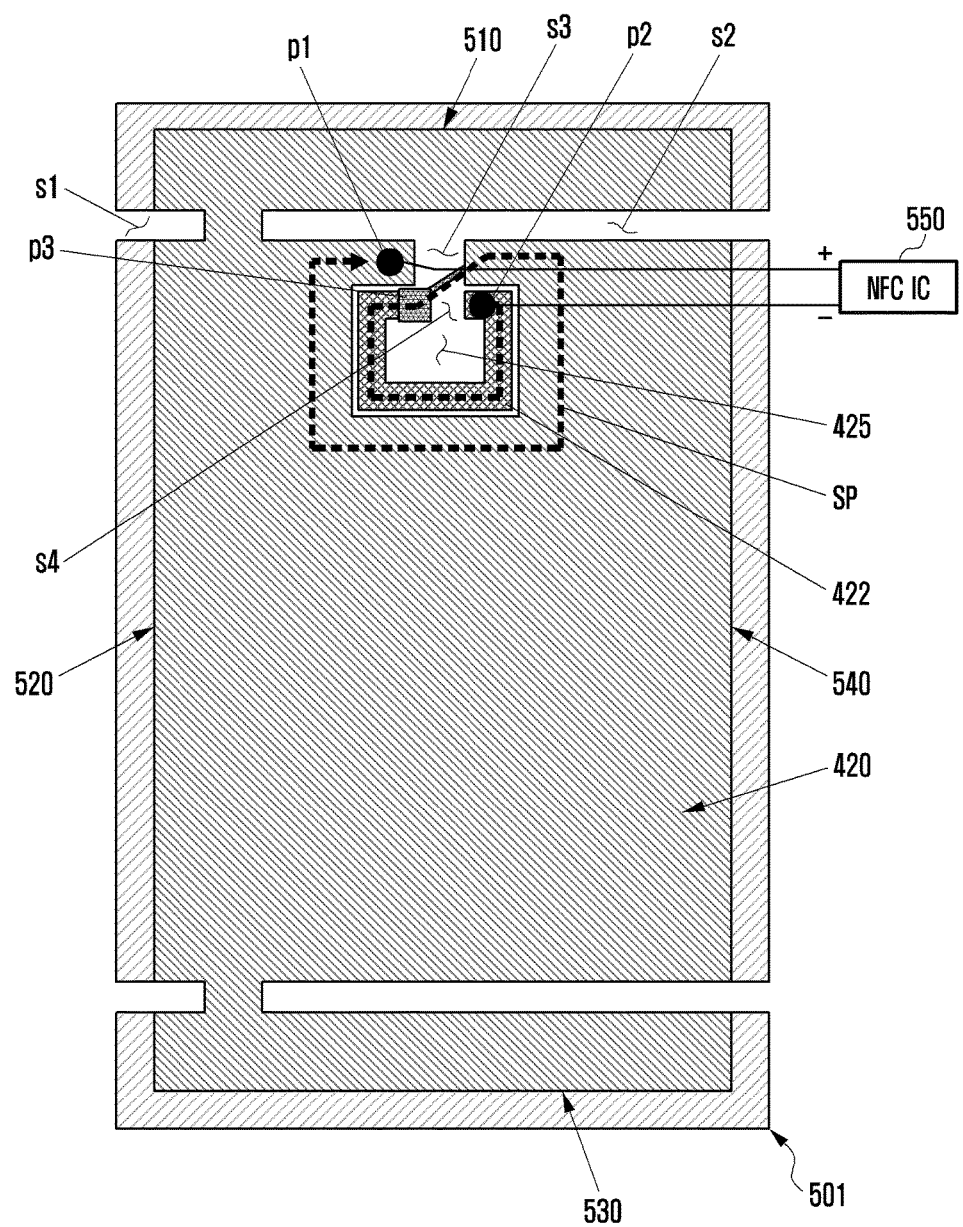
FIG. 16 is a diagram illustrating an electronic device including a housing antenna formed from a conductive material according to another embodiment of the present disclosure.

FIG. 16 is a diagram illustrating an electronic device including a housing antenna formed from a conductive material according to another embodiment of the present disclosure.

As shown in FIG. 16, the electronic device according to one embodiment may include the second plate 420 and the side member 501 having the first lateral surface 510, the second lateral surface 520, the third lateral surface 530, and the fourth lateral surfaces 540. Portions of the second plate 420 and the side member 501 may be made of a conductive material such as a metal. Portions of the second plate 420 and the side member 501 may operate as an antenna for wireless communication.

According to one embodiment, the second plate 420 may have a substantially rectangular shape. As explained above, the second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view as shown in FIG. 16, the second plate 420 may include the first slit s1 that is disposed between the first side and the third side extending widthwise from a certain position (e.g., the first position) on the second side. The second lateral surface 520 of the side member 501 may include a slit corresponding to the first slit s1. In addition, the second plate 420 may include the second slit s2 that is aligned with the first slit s1 and extending widthwise from a certain position (e.g., the second position) on the fourth side. The slits s1 and s2 may be spaced apart by a portion of the second plate 420. The fourth lateral surface 540 of the side member 501 may include a slit corresponding to the second slit s2. Further, the second plate 420 may include an opening 425 formed in a portion of the second plate 420 between the third side and at least one of the first and second slits s1 and s2. For example, the opening 425 may accommodate the rear camera 421 as shown in FIG. 4. In the top view, the second plate 420 may also include the third slit s3 that extends from the second slit s2 to the opening 425.

According to one embodiment, the opening 425 may be in a substantially rectangular shape. In the opening 425, a camera mounting frame 422 may be provided so that the rear camera 421 can be mounted. The camera mounting frame 422 has a central hole and may be made of metal. The camera mounting frame 422 may also include a fourth slit s4 that extends from the central hole to the third slit s3.

A first point p1 (e.g., a first contact) may be adjacent to the third slit s3 and between the third lateral surface 530 of the side member 501 and the second slit s2. In addition, a second point p2 (e.g., a second contact) may be at a portion (e.g., one end) of the camera mounting frame 422. The one end of the camera mounting frame 422 where the second point p2 is disposed may be closer to the fourth lateral surface 540. Further, a third point p3 (e.g., a third contact) may be at another portion (e.g., the other end) of the camera mounting frame 422 between the third lateral surface 530 of the side member 501 and the third slit s3. The other end of the camera mounting frame 422 may be closer to the second lateral surface 520.

The NFC IC 550 may be electrically connected to the first point p1 and the second point p2. A signal path SP (e.g., a current path) may be formed from the first point p1, through the third point p3, and to the second point p2. For example, the signal path SP (shown in dashed line in FIG. 16) includes the portion of the second plate 420 that surrounds the opening 425 and the camera mounting frame 422. The signal path SP may operate as a loop antenna of NFC communication. The NFC IC 550 may be electrically coupled to the first point p1 and the second point p2 to provide RF signals (e.g., power feed).

The NFC 550 may be connected to the first point p1, the second point p2, and the third point p3 via inductors having high inductances. The third point p3 may be connected to the portion of the second plate 420 across the fourth slit s4 through a wound coil. The wound coil may be on an axis perpendicular to the second plate. The first point p1, the second point p2, and the NFC IC 550 may be connected to each other using inductors having high inductance, so that the signal path can operate in the high frequency band. The same configuration and material as those of the previous embodiment disclosed in FIG. 13 may be applied to this embodiment.

Figure 17:
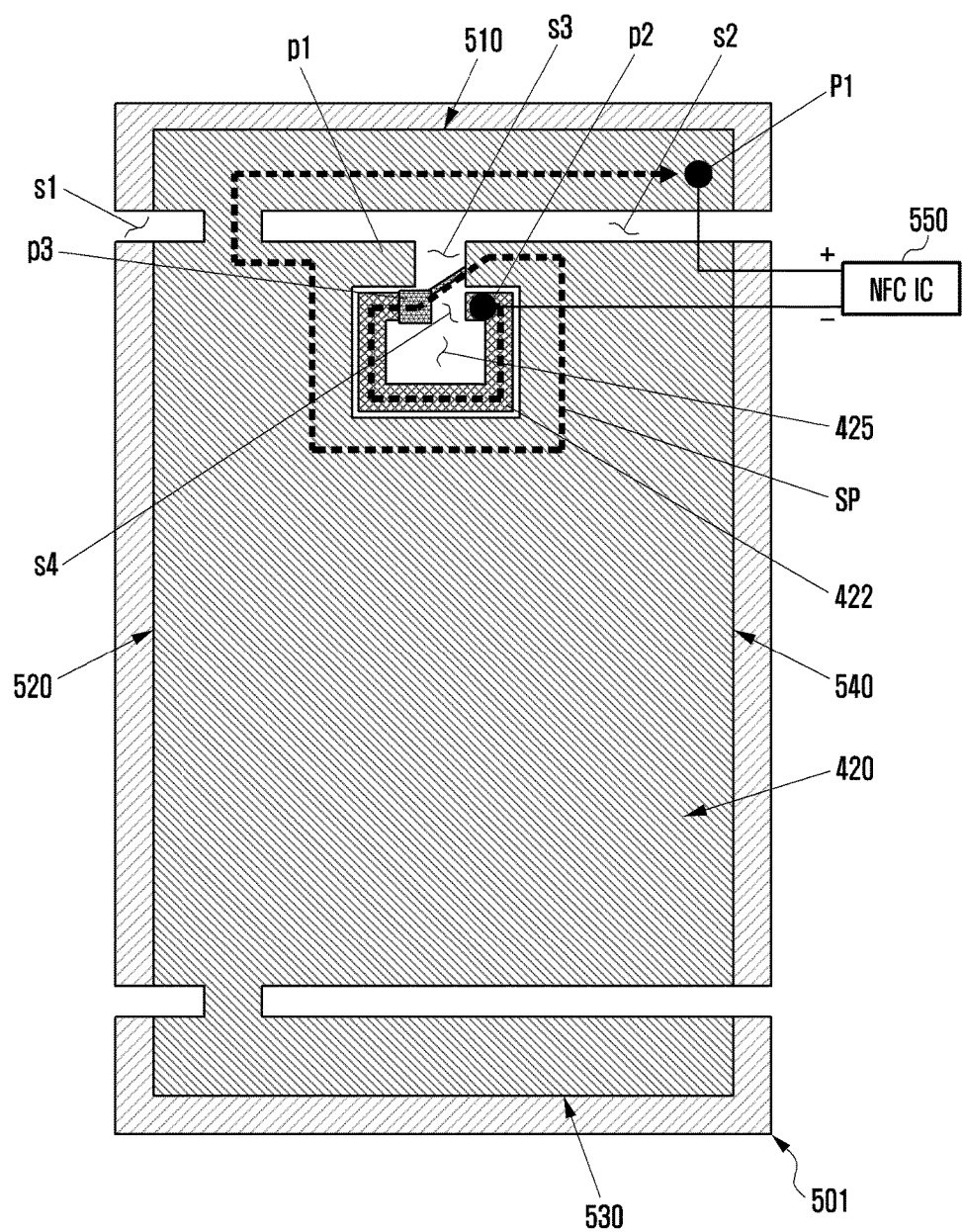
FIG. 17 is a diagram illustrating a modification of a first point p1 originally shown in FIG. 16.

FIG. 17 is a diagram illustrating a modification of a first point p1 originally shown in FIG. 16.

In the following description regarding FIG. 17, the same parts as those of FIG. 16 described above may not be described in detail.

As shown in FIG. 17, according to one embodiment, the first point p1 may be adjacent to the fourth lateral surface 540 and between the first lateral surface 510 of the side member 501 and the second slit s2. In addition, the second point p2 (e.g., the second contact) may be at a portion (e.g., one end) of the camera mounting frame 422. The one end of the camera mounting frame 422 where the second point p2 is disposed may be closer to the fourth lateral surface 540. Further, the third point p3 (e.g., a third contact) may be at another portion (e.g., the other end) of the camera mounting frame 422 between the third lateral surface 530 of the side member 501 and the third slit s3. The other end of the camera mounting frame 422 may be closer to the second lateral surface 520.

According to one embodiment, the NFC IC 550 may be electrically connected to the first point p1 and the second point p2. A signal path SP (e.g., a current path) may be formed from the first point p1, through the third point p3, and to the second point p2. For example, the signal path SP (shown in dashed line in FIG. 16) includes the portion of the second plate 420 that surrounds the opening 425 and the camera mounting frame 422. The signal path SP may operate as a loop antenna of NFC communication.

Figure 18:
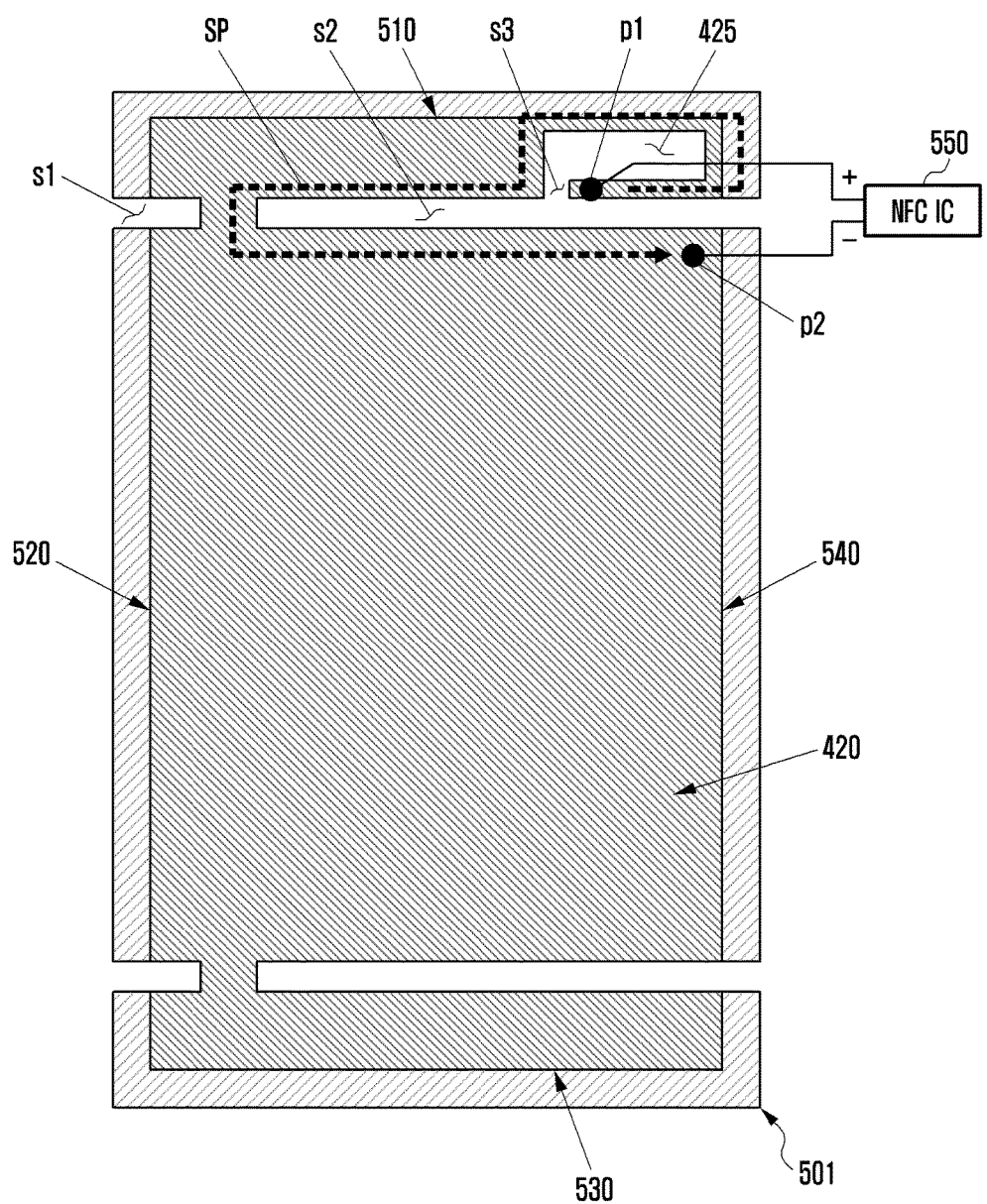
FIG. 18, FIG. 19, FIG. 20, FIG. 21, FIG. 22, FIG. 23, FIG. 24 and FIG. 25 are diagrams illustrating an electronic device including a housing antenna formed from a conductive material according to various embodiments of the present disclosure.

FIG. 18 is a diagram illustrating an electronic device including a housing antenna formed from a conductive material according to still another embodiment of the present disclosure.

As shown in FIG. 18, the electronic device according to one embodiment may include the second plate 420 and the side member 501 having the first lateral surface 510, the second lateral surface 520, the third lateral surface 530, and the fourth lateral surfaces 540. Portions of the second plate 420 and the side member 501 may be made of a conductive material such as a metal. Portions of the second plate 420 and the side member 501 may operate as an antenna for wireless communication.

According to one embodiment, the second plate 420 may have a substantially rectangular shape. As explained above, the second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

According to one embodiment, in the top view as shown in FIG. 18, the second plate 420 may include the first slit s1 that is disposed between the first side and the third side extending widthwise from a certain position (e.g., the first position) on the second side. The second lateral surface 520 of the side member 501 may include a slit corresponding to the first slit s1. In addition, the second plate 420 may include the second slit s2 that is aligned with the first slit s1 and extending widthwise from a certain position (e.g., the second position) on the fourth side. The first slit s1 and the second slit s2 may be spaced apart by a portion of the second plate 420. The fourth lateral surface 540 of the side member 501 may include a slit corresponding to the second slit s2. Further, the second plate 420 may include an opening 425 formed in a portion of the second plate 420 between the first lateral surface 510 and at least one of the first and second slits s1 and s2. In the top view, the second plate 420 may also include the third slit s3 that extends from the second slit s2 to the opening 425.

The second plate 420 may have non-conductive materials filling the first slit s1, the second slit s2, the third slit s3, and/or the opening 425.

The side member 501 may include a conductive region defined by the slits s1 and s2 that includes an upper portion of the second lateral surface 520, the first lateral surface 510, and an upper portion of the fourth lateral surface 540. For example, the conductive region may be a portion of the side member 501 that extends from the first position to the second position. The conductive region may be separated from the rest of the side member 501 by the non-conductive materials that fill the slits s1 and s2.

A first point p1 (e.g., a first contact) may be adjacent to the fourth lateral surface 540 and between the first lateral surface 510 of the side member 501 and the second slit s2. In addition, a second point p2 (e.g., a second contact) may be adjacent to the fourth lateral surface 540 and between the third lateral surface 530 of the side member 501 and the second slit s2.

According to one embodiment, the NFC IC 550 may be electrically connected to the first point p1 and the second point p2. A signal path SP (e.g., a current path) may be formed from the first point p1 to the second point p2. For example, the signal path SP (shown in dashed line in FIG. 18) includes the portion of the second plate 420 that surrounds the opening 425, a portion of the second plate 420 between the first lateral surface 510 and the second slit s2, a portion of the second plate 420 between the first and second slits s1 and s2, and a portion of the second plate 420 between the second slit s2 and the third lateral surface 530. The signal path SP may operate as a loop antenna of NFC communication. The NFC IC 550 may be electrically coupled to the first point p1 and the second point p2 to provide RF signals (e.g., power feed). The second plate 420 may operate as an antenna for NFC communication together with a portion of the side member 501.

The NFC IC 550 may be connected to the first and second points p1 and p2 via inductors having high inductances, so that the signal path can operate in the high frequency band. Doing so prevents interference with other high-frequency communication (e.g., LTE, etc.). Alternatively, the second plate 420 may include one or more inductors on the signal path SP. The second plate 420 may further include, for example, at least one low-pass filter on the signal path SP. Inductors or low-pass filters included on the signal path SP may block signal components of frequencies other than the operating frequency of short-range communication (e.g., approximately 13.56 MHz). Therefore, interference with other long-distance wireless communication may be prevented.

Figure 19:
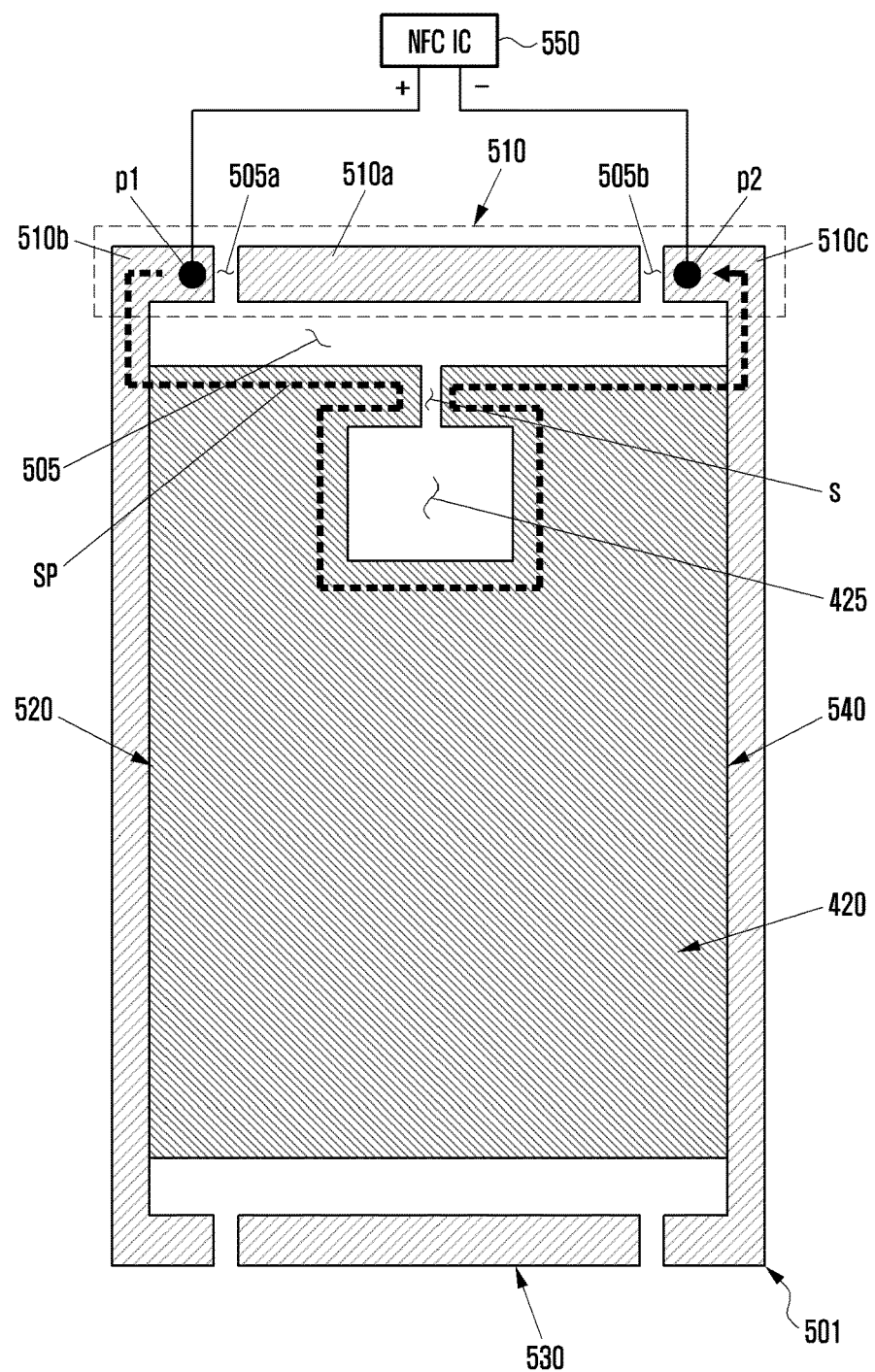

FIG. 19 is a diagram illustrating an electronic device including a housing antenna formed from a conductive material according to yet another embodiment of the present disclosure.

As shown in FIG. 19, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

According to one embodiment, the second plate 420 may have a substantially rectangular shape. The second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view shown in FIG. 19, the second plate 420 may include a conductive region that extends between the first and third sides and overlapping a portion of the second and fourth sides.

The second plate 420 may include a non-conductive region 505 disposed between the first lateral surface 510 and the top of the conductive region of the second plate 420.

The second plate 420 may include an opening 425 formed in a portion of the second plate 420 between the non-conductive region 505 and the third lateral surface 530. In addition, the second plate 420 may include a slit s that extends from the non-conductive region 505 to the opening 425.

the side member 501 may include a first conductive part 510a that extends widthwise. Also, the side member 501 may include a second conductive part 510b that surrounds a corner of the second plate 420. Also, the side member 501 may include a third conductive part 510c that surrounds another corner of the second plate 420.

A first non-conductive part 505a may be formed between the first conductive part 510a and the second conductive part 510b to electrically separate the first conductive part 510a and the second conductive part 510b. Similarly, a second non-conductive part 505b may be formed between the first conductive part 510a and the third conductive part 510c to electrically separate the first conductive part 510a and the third conductive part 510c.

A first point p1 (e.g., a first contact) may be at one end of the second conductive part 510b adjacent to the first non-conductive part 505a. In addition, a second point p2 (e.g., a second contact) may be at one end of the third conductive part 510c adjacent to the second non-conductive part 505b. The second and third conductive parts 510b and 510c of the side member 501 may be connected to the conductive region of the second plate 420. In other words, the conductive region of the second plate 420 may be in contact with the second and third conductive parts 510b and 510c of the side member 501.

The NFC IC 550 may be electrically connected to the first point p1 and the second point p2. A signal path SP (e.g., a current path) may be formed from the first point p1 to the second point p2. For example, the signal path SP (shown in dashed line in FIG. 19) includes the second conductive part 510b of the side member 501, a portion of the conductive region of the second plate 420 adjacent to the non-conductive region 505, a portion of the conductive region surrounding the opening 425, and the third conductive part 510c of the side member 501. The signal path SP may operate as a loop antenna of NFC communication. The NFC IC 550 may be electrically coupled to the first point p1 and the second point p2 to provide RF signals (e.g., power feed). Thus, the second plate 420 may operate as an antenna for NFC communication together with a portion of the side member 501.

The NFC IC 550 may be connected to the first and second points p1 and p2 via inductor having high inductances, so that the signal path can operate in the high frequency band. Doing so prevents interference with other high-frequency communication (e.g., LTE, etc.). The second plate 420 may include at least one inductor on the signal path SP. The second plate 420 may further include at least one low-pass filter on the signal path SP.

Figure 20:
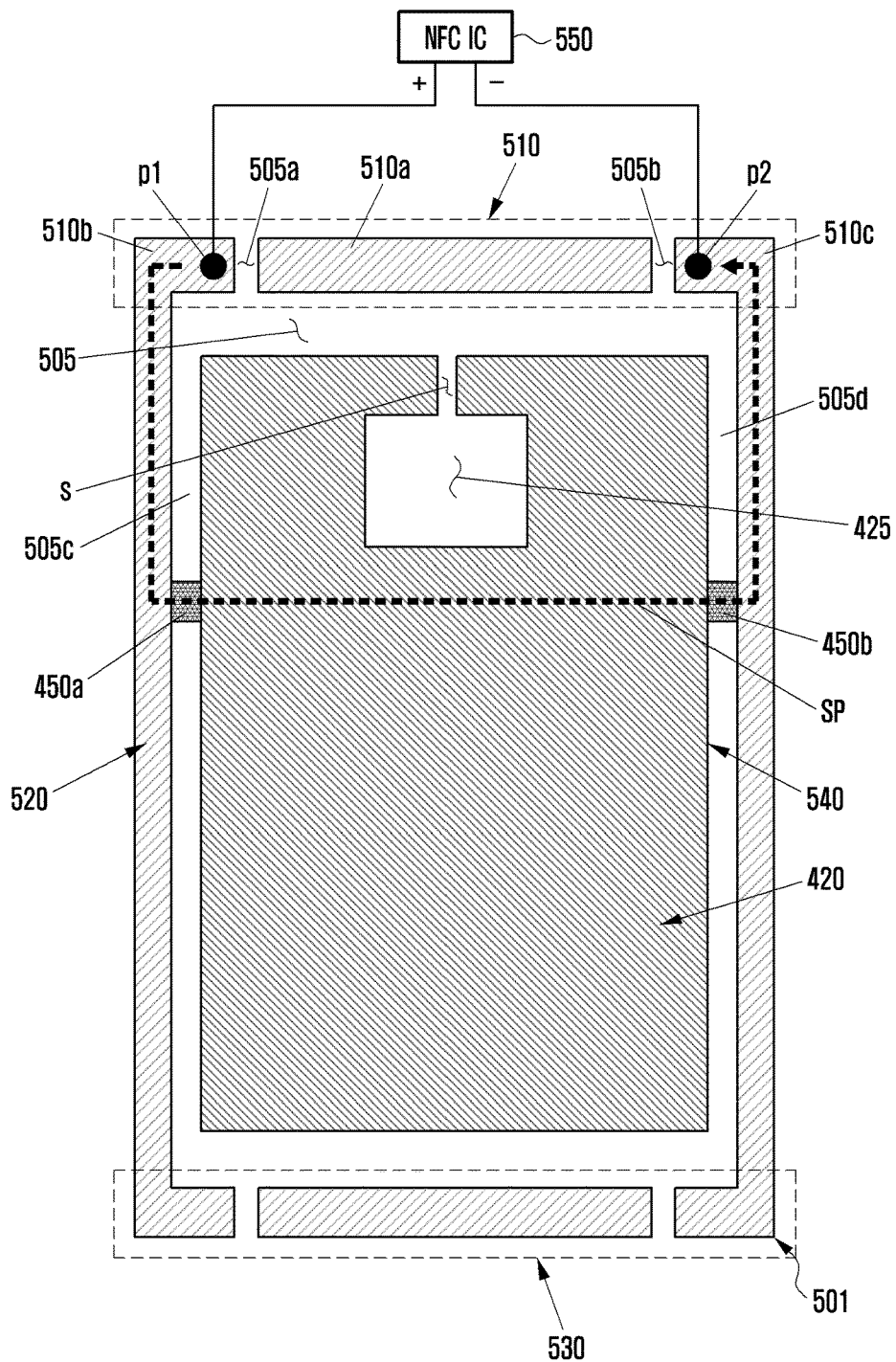

FIG. 20 is a diagram illustrating an electronic device including a housing antenna formed from a conductive material according to yet another embodiment of the present disclosure.

As shown in FIG. 20, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

According to one embodiment, the second plate 420 may have a substantially rectangular shape. As explained above, the second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view shown in FIG. 20, an elongated slit may be formed along all four sides between the second plate 420 and the side member 501. The elongated slit may be filled with a non-conductive material to form a non-conductive region 505.

The second plate 420 may include an opening 425 formed in a portion of the second plate 420 between the first lateral surface 510 surface and the third lateral surface 530. In addition, the second plate 420 may include a slit s that extends from the non-conductive region 505 to the opening 425.

The side member 501 may include a first conductive part 510a that extends widthwise. Also, the side member 501 may include a second conductive part 510b that extends along a portion of the first side, all of the second side, and a portion of the third side of the second plate 420. In other words, the second conductive part 510b may encompass the entire second lateral surface 520. And the side member 501 may include a third conductive part 510c that extends along another portion of the first side, all of the fourth side, and another portion of the third side of the second plate 420.

A first non-conductive part 505a may be formed between the first conductive part 510a and the second conductive part 510b to electrically separate the first conductive part 510a and the second conductive part 510b. Similarly, a second non-conductive part 505b may be formed between the first conductive part 510a and the third conductive part 510c to electrically separate the first conductive part 510a and the third conductive part 510c.

A first connecting part 450a may be formed to electrically connect the second side of the second plate 420 and the second lateral surface 520 of the side member 501. Similarly, a second connecting part 450b may be formed to electrically connect the fourth side of the second plate 420 and the fourth lateral surface 540 of the side member 501. In one example, each of the first and second connecting parts 450a and 450b may include an inductor.

A first point p1 (e.g., a first contact) may be at one end of the second conductive part 510b adjacent to the first non-conductive part 505a. In addition, a second point p2 (e.g., a second contact) may be at one end of the third conductive part 510c adjacent to the second non-conductive part 505b. The second and third conductive parts 510b and 510c of the side member 501 may be connected to the conductive region of the second plate 420 through the first and second connecting parts 450a and 450b.

The NFC IC 550 may be electrically connected to the first point p1 and the second point p2. A signal path SP (e.g., a current path) may be formed from the first point p1 to the second point p2. For example, the signal path SP (shown in dashed line in FIG. 20) includes the second conductive part 510b of the side member 501, the first connecting part 450a, a portion of the second plate 420, the second connecting part 450b, and the third conductive part 510c of the side member 501. The signal path SP may operate as a loop antenna of NFC communication. The same configuration and material as those of the previous embodiment disclosed in FIG. 19 may be applied to this embodiment.

Figure 21:
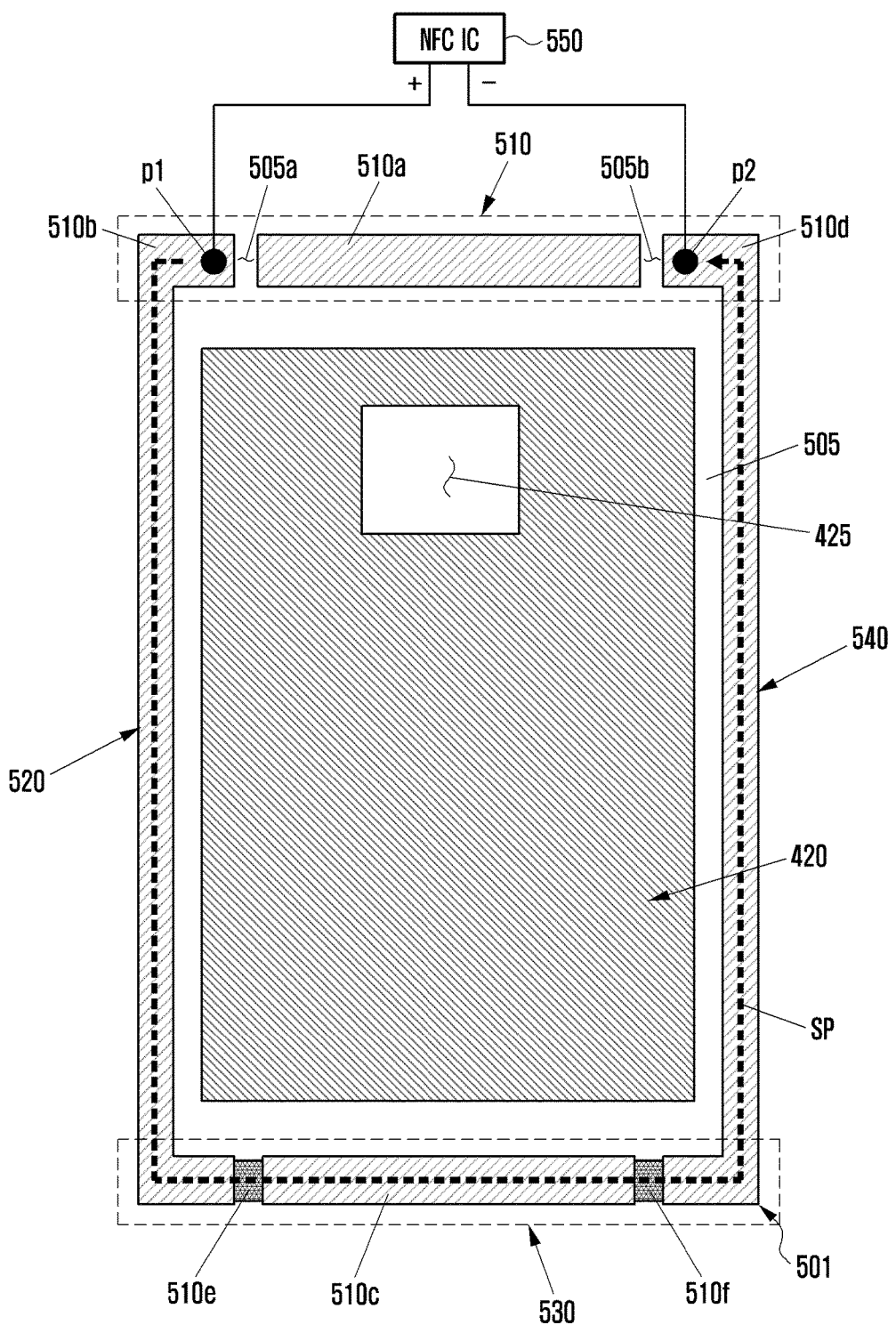

FIG. 21 is a diagram illustrating an electronic device including a housing antenna formed from a conductive material according to yet another embodiment of the present disclosure.

As shown in FIG. 21, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

According to one embodiment, the second plate 420 may have a substantially rectangular shape. The second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view shown in FIG. 21, an elongated slit may be formed along all four sides between the second plate 420 and the side member 501. The elongated slit may be filled with a non-conductive material to form a non-conductive region 505.

The second plate 420 may include an opening 425 formed in a portion of the second plate 420.

The side member 501 may include a first conductive part 510a that extends widthwise along the first side of the second plate. The side member 501 may include a second conductive part 510b that extends along the first, second and third sides of the second plate 420. In addition, the side member 501 may include a third conductive part 510c that extends widthwise along the third side of the second plate 420. And finally, the side member 501 may include a fourth conductive part 510d that extends along the third, fourth and first sides of the second plate 420.

A first non-conductive part 505a may be formed between the first conductive part 510a and the second conductive part 510b to electrically separate the first conductive part 510a and the second conductive part 510b. Similarly, a second non-conductive part 505b may be formed between the first conductive part 510a and the fourth conductive part 510d to electrically separate the first conductive part 510a and the fourth conductive part 510d. In addition, slits may be formed between the second and third conductive parts 510b and 510c and between the third and fourth conductive parts 510c and 510d.

A fifth conductive part 510e may be formed between the second and third conductive parts 510b and 510c to electrically connect the second and third conductive parts 510b and 510c. Similarly, a sixth conductive part 510f may be formed between the third and fourth conductive parts 510c and 510d to electrically connect the third and fourth conductive parts 510c and 510d. The fifth and sixth conductive parts 510e and 510f may be inductors.

A first point p1 (e.g., a first contact) may be at one end of the second conductive part 510b adjacent to the first non-conductive part 505a. In addition, a second point p2 (e.g., a second contact) may be at one end of the fourth conductive part 510d adjacent to the second non-conductive part 505b.

The NFC IC 550 may be electrically connected to the first point p1 and the second point p2. A signal path SP (e.g., a current path) may be formed from the first point p1 to the second point p2. For example, the signal path SP (shown in dashed line in FIG. 21) includes the second conductive part 510b of the side member 501, the fifth conductive part 510e, the third conductive part 510c, the sixth conductive part 510f, and the fourth conductive part 510d. The signal path SP may operate as a loop antenna of NFC communication. The same configuration and material as those of the previous embodiment disclosed in FIG. 20 may be applied to this embodiment.

Figure 22:
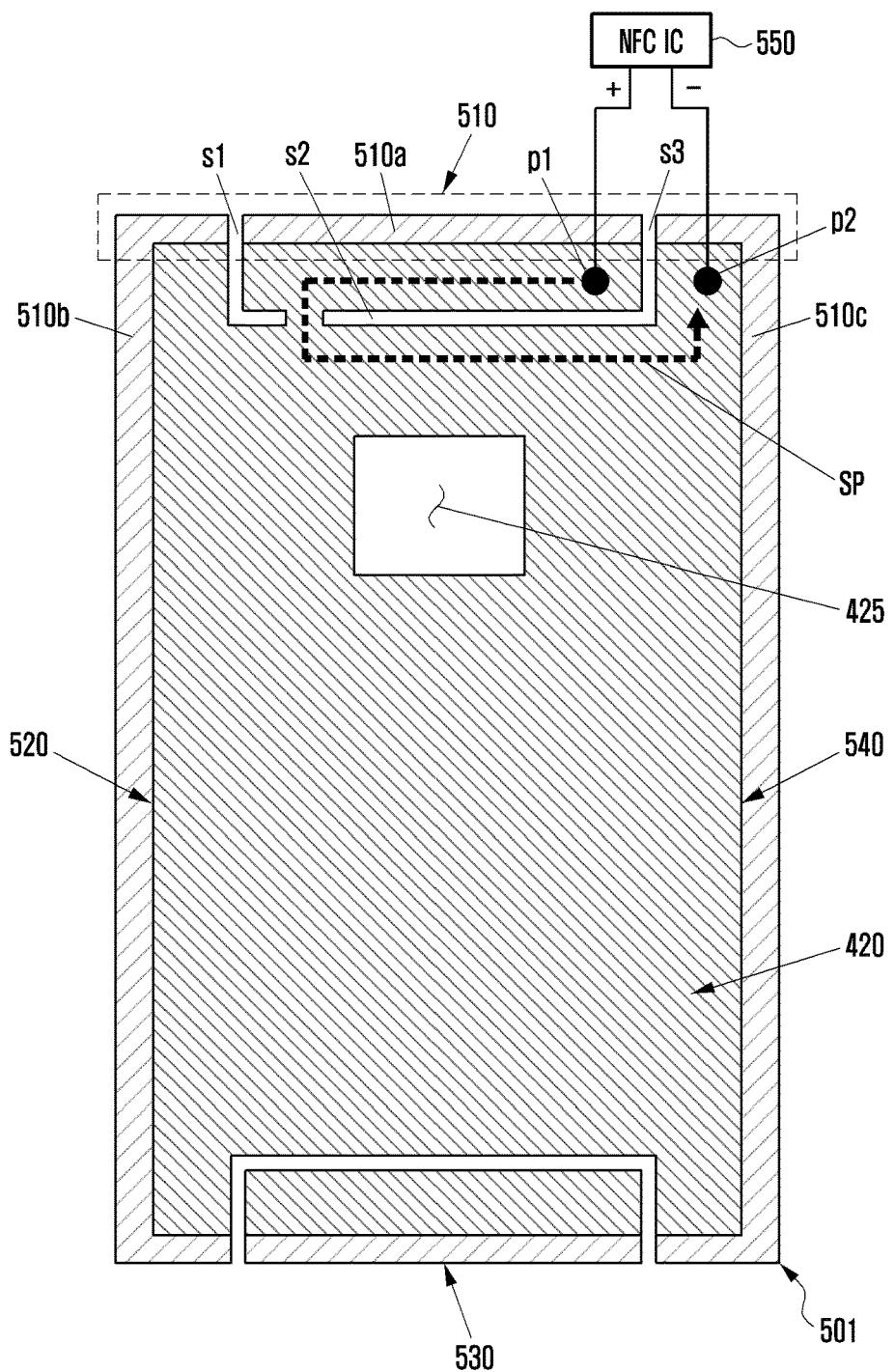

FIG. 22 is a diagram illustrating an electronic device including a housing antenna formed from a conductive material according to yet another embodiment of the present disclosure.

As shown in FIG. 22, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

According to one embodiment, the second plate 420 may have a substantially rectangular shape. The second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view shown in FIG. 22, the second plate 420 may include a first slit s1 extending lengthwise from a certain position (e.g., the first position) of the first side and then bends to extend widthwise. In addition, the second plate 420 may include a second slit s2 that extends widthwise. A portion of the second plate 420 may separate the first slit s1 and the second slit s2. In addition, the second plate 420 may include a third slit s3 extending lengthwise from another position (e.g., the second position) of the first side and is then connected to the second slit s2. Accordingly, the first slit s1 and the third slit s3 may be separated from each other. The first lateral surface 510 of the side member 501 may include slits corresponding to the first and third slits s1 and s3. These slits and the first to third slits s1 to s3 may be filled with non-conductive materials. Further, the second plate 420 may include an opening 425 formed in a portion of the second plate 420 between the second slit s2 and the third lateral surface 530.

The side member 501 may include a first conductive part 510a that extends widthwise along the first side of the second plate 420. The side member 501 may also include a second conductive part 510b that extends along the second side and a portion of the first side of the second plate 420. In addition, the side member 501 may include a third conductive part 510c that extends along the fourth side and a portion of the first side of the second plate 420. According to one embodiment, the first slit s1 may be disposed between the first and second conductive parts 510a and 510b. In the first slit s1, it may be filled with a non-conductive material so as to electrically separate the first and second conductive parts 510a and 510b. Further, the third slit s3 may be disposed between the first and third conductive parts 510a and 510c. In the third slit s3, it may be filled with a non-conductive material so as to electrically separate the first and third conductive parts 510a and 510c.

A first point p1 (e.g., a first contact) may be at a portion of the second plate 420 adjacent to one side of the third slit s3 and between the first conductive part 510a and the second slit s2. In addition, a second point p2 (e.g., a second contact) may be at another portion of the second plate 420 adjacent to the other side of the third slit s3 and between the third slit s3 and the third conductive part 510c. The second and third conductive parts 510b and 510c of the side member 501 may be connected to a conductive region of the second plate 420.

The NFC IC 550 may be electrically connected to the first point p1 and the second point p2. A signal path SP (e.g., a current path) may be formed from the first point p1 to the second point p2. For example, the signal path SP (shown in dashed line in FIG. 22) includes a portion of the second plate 420 between the first and second slits s1 and s2 and a portion of the second plate 420 between the second slit s2 and the opening 425. The signal path SP may operate as a loop antenna of NFC communication. The NFC IC 550 electrically coupled to the first and second points p1 and p2 may provide RF signals (e.g., power feed). The NFC IC 550 may be connected to the first and second points p1 and p2 via inductor(s) having high inductances, so that the signal path can operate in the high frequency band. The second plate 420 may include at least one inductor on the signal path SP. The second plate 420 may further include at least one low-pass filter on the signal path SP.

Figure 23:
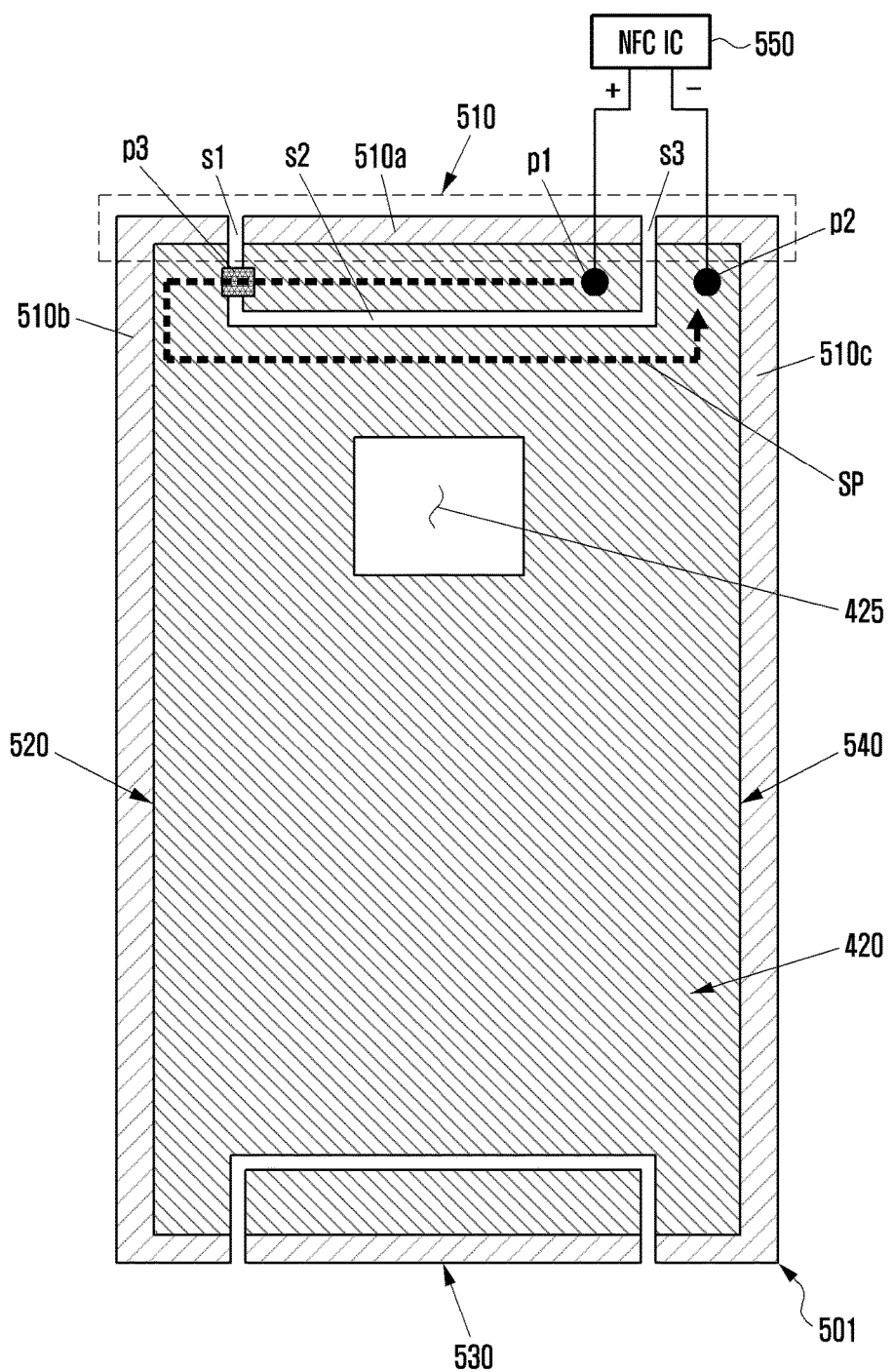

FIG. 23 is a diagram illustrating an electronic device including a housing antenna formed from a conductive material according to yet another embodiment of the present disclosure.

As shown in FIG. 23, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

The second plate 420 may have a substantially rectangular shape. The second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view shown in FIG. 23, the second plate 420 may include a first slit s1 that extends lengthwise from a certain position (e.g., the first position) of the first side. In addition, the second plate 420 may include a second slit s2 that extends widthwise from the end of the first slit s1 toward the fourth side. Further, the second plate 420 may include a third slit s3 that extends lengthwise from another position (e.g., the second position) of the first side and is then connected to the second slit s2. As such, in this example, the first, second and third slits s1, s2 and s3 may be connected to each other. The first lateral surface 510 of the side member 501 may include slits corresponding to the first and third slits s1 and s3. Further, the second plate 420 may include an opening 425 formed in a portion of the second plate 420 between the second slit s2 and the third lateral surface 530. According to one embodiment, the side member 501 may include a first conductive part 510a that extends widthwise along the first side of the second plate 420. The side member 501 may also include a second conductive part 510b that extends along the second side and a portion of the first side of the second plate 420. Further the side member 501 may include a third conductive part 510c that extends along the fourth side and a portion of the first side of the second plate 420.

The first slit s1 may be disposed between the first and second conductive parts 510a and 510b. The first slit s1 may be filled with a non-conductive material to electrically separate the first and second conductive parts 510a and 510b. In addition, the third slit s3 may be disposed between the first and third conductive parts 510a and 510c. Likewise, the third slit s3 may be filled with a non-conductive material to electrically separate the first and third conductive parts 510a and 510c. The second slit s2 may also be filled with a non-conductive material.

A first point p1 (e.g., a first contact) may be at a portion of the second plate 420 adjacent to one side of the third slit s3 and between the first lateral surface 510 of the side member 501 and the second slit s2. In addition, a second point p2 (e.g., a second contact) may be at another portion of the second plate 420 adjacent to the other side of the third slit s3 and between the third slit s3 and the fourth lateral side 540.

The NFC IC 550 may be electrically connected to the first point p1 and the second point p2. A signal path SP (e.g., a current path) may be formed from the first point p1 to the second point p2. To create an electrical connection between the first point p1 and the second point p2, the signal path SP may further include a third point p3 (e.g. a third contact). A component may be provided at the third point p3 to provide electrical connection through the first slit s1. For example, an inductor may be provided at the third point p3. The signal path SP (shown in dashed line in FIG. 23) includes a portion of the second plate 420 between the first and third points p1 and p3, the component at the third point p3, and a portion of the second plate 420 between the second slit s2 and the opening 425. The signal path SP may operate as a loop antenna of NFC communication. The NFC IC 550 electrically coupled to the first and second points p1 and p2 may provide RF signals (e.g., power feed). Inductors having high inductance may also be provided at the first point p1 and the second point p2. Further, at least one inductor and/or at least one low-pass filter may be provided on the signal path SP.

Figure 24:
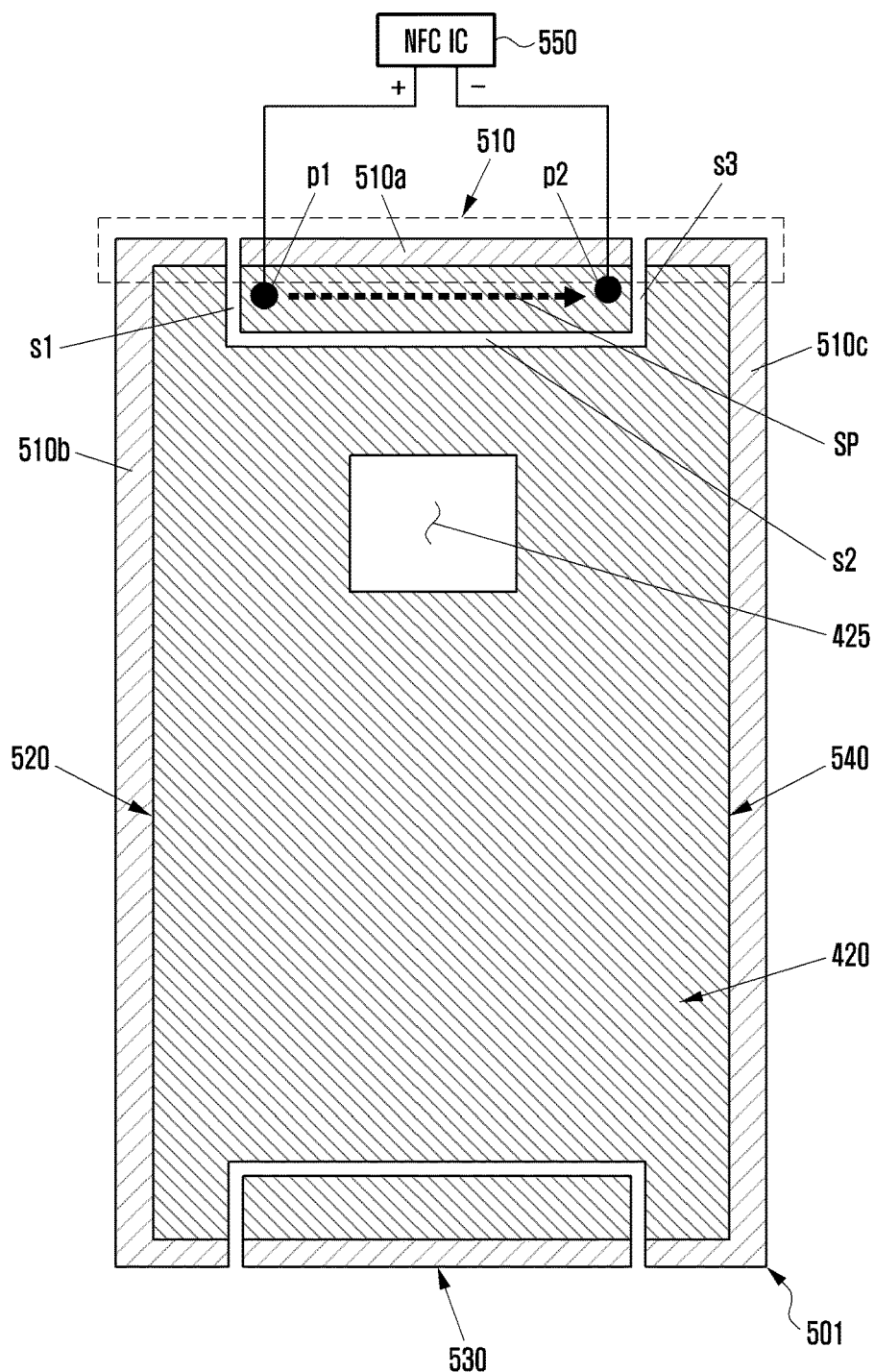

FIG. 24 is a diagram illustrating an electronic device including a housing antenna formed from a conductive material according to yet another embodiment of the present disclosure.

As shown in FIG. 24, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

The second plate 420 may have a substantially rectangular shape. The second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

In the top view shown in FIG. 24, the second plate 420 may include a first slit s1 that extends lengthwise from a certain position (e.g., the first position) of the first side. In addition, second plate 420 may include a second slit s2 that extends widthwise from an end of the first slit s1 toward the fourth side. The second plate 420 may further include a third slit s3 that extends lengthwise from another position (e.g., the second position) of the first side and then connects to the second slit s2. As such, the first, second and third slits s1, s2 and s3 may be connected to each other. The first lateral surface 510 of the side member 501 may include slits corresponding to the first and third slits s1 and s3. Further, the second plate 420 may include an opening 425 formed in a portion of the second plate 420 between the second slit s2 and the third lateral surface 530. According to one embodiment, the side member 501 may include a first conductive part 510a that extends widthwise along the first side of the second plate 420. The side member 501 may also include a second conductive part 510b that extends along the second side and a portion of the first side of the second plate 420. Further, the side member 501 may include a third conductive part 510c that extends along the fourth side and a portion of the first side of the second plate 420.

The first slit s1 may be disposed between the first and second conductive parts 510a and 510b. The first slit s1 may be filled with a non-conductive material to physically separate the first and second conductive parts 510a and 510b. In addition, the third slit s3 may be disposed between the first and third conductive parts 510a and 510c. The third slit s3 may be filled with a non-conductive material to physically separate the first and third conductive parts 510a and 510c. The second slit s2 may also be filled with a non-conductive material.

A first point p1 (e.g., a first contact) may be at a portion of the second plate 420 adjacent to the first slit s1 and between the first lateral surface 510 of the side member 501 and the second slit s2. In addition, a second point p2 (e.g., a second contact) may be at another portion of the second plate 420 adjacent to the third slit s3 and between the first lateral surface 510 of the side member 501 and the second slit s2.

The NFC IC 550 may be electrically connected to the first point p1 and the second point p2. A signal path SP (e.g., a current path) may be formed from the first point p1 to the second point p2. For example, the signal path SP (shown in dashed line in FIG. 24) includes a portion of the second plate 420 between the first conductive part 510a and the second slit s2. The signal path SP may operate as a loop antenna of NFC communication. The NFC IC 550 electrically coupled to the first and second points p1 and p2 may provide RF signals (e.g., power feed). According to one embodiment, inductors having high inductance may be provided at the first and second points p1 and p2. Further, at least one inductor and/or at least one low-pass filter may be provided on the signal path SP.

Figure 25:
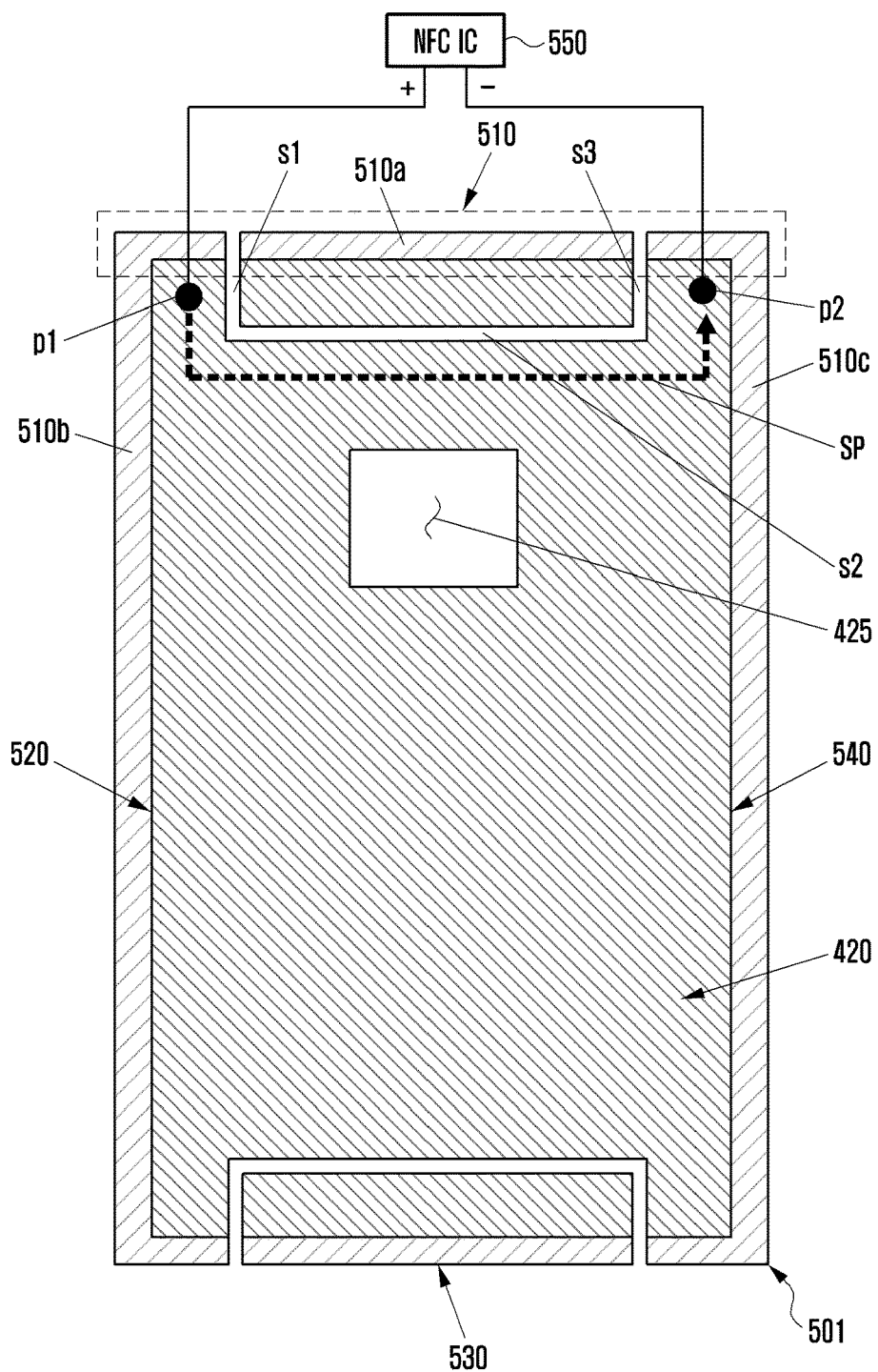

FIG. 25 is a diagram illustrating an electronic device including a housing antenna formed from a conductive material according to yet another embodiment of the present disclosure.

As shown in FIG. 25, the electronic device according to one embodiment may include the second plate 420 and the side member 501 having the first lateral surface 510, the second lateral surface 520, the third lateral surface 530, and the fourth lateral surfaces 540.

Portions of the second plate 420 and the side member 501 may be made of a conductive material such as a metal. Portions of the second plate 420 and the side member 501 may operate as an antenna for wireless communication.

The second plate 420 may have a substantially rectangular shape. The second plate 420 may form the rear surface of the electronic device. The second plate 420 may have a rectangular shape that includes the first side having a certain length (e.g., the first length) and extending in the first direction (e.g., widthwise), the second side having another length (e.g., the second length) greater than the first length and extending in the second direction (e.g., lengthwise) perpendicular to the first direction, the third side having the same length (e.g., the first length) as that of the first side and extending parallel with the first side in the first direction, and the fourth side having the same length (e.g., the second length) as that of the second side and extending parallel with the second side in the second direction.

The side member 501 may include the first lateral surface 510 forming the upper lateral surface of the electronic device, the second lateral surface 520 forming the left lateral surface of the electronic device, the third lateral surface 530 forming the lower lateral surface of the electronic device, and the fourth lateral surface 540 forming the right lateral surface of the electronic device.

The first side, the second side, the third side and the fourth side of the second plate 420 may be surrounded by the first lateral surface 510, the second lateral surface 520, the third lateral surface 530 and the fourth lateral surface 540 of the side member 501.

As shown in the top view in FIG. 25, the second plate 420 may include a first slit s1 that extends lengthwise from a certain position (e.g., the first position) of the first side. In addition, the second plate 420 may include a second slit s2 that extends widthwise from the end of the first slit s1 toward the fourth side. Further, the second plate 420 may include a third slit s3 that extends lengthwise from another position (e.g., the second position) of the first side and connects to the second slit s2. Thus, the first, second and third slits s1, s2 and s3 may be connected to each other. The first lateral surface 510 of the side member 501 may include slits corresponding to the first and third slits s1 and s3. In addition, the second plate 420 may include an opening 425 formed in a portion of the second plate 420 between the second slit s2 and the third lateral surface 530. The side member 501 may include a first conductive part 510a that extends widthwise along the first side of the second plate 420. The side member 501 may also include a second conductive part 510b that extends along the second side and a portion of the first side of the second plate 420. Further, the side member 501 may include a third conductive part 510c that extends along the fourth side and a portion of the first side of the second plate 420.

According to one embodiment, the first slit s1 may be disposed between the first and second conductive parts 510a and 510b. The first slit s1 may be filled with a non-conductive material to electrically separate the first and second conductive parts 510a and 510b. In addition, the third slit s3 may be disposed between the first and third conductive parts 510a and 510c. The third slit s3 may be filled with a non-conductive material to electrically separate the first and third conductive parts 510a and 510c. Also, a non-conductive material may fill the second slit s2.

A first point p1 (e.g., a first contact) may be at a portion of the second plate 420 adjacent to the first lateral surface 510 of the side member 501 and between the first slit s1 and the second conductive part 510b. In addition, a second point p2 (e.g., a second contact) may be at another portion of the second plate 420 adjacent to the first lateral surface 510 of the side member 501 and between the third slit s3 and the third conductive part 510c.

The NFC IC 550 may be electrically connected to the first point p1 and the second point p2. A signal path SP (e.g., a current path) may be formed from the first point p1 to the second point p2. For example, the signal path SP (shown in dashed line in FIG. 25) includes a portion of the second plate 420 between the second slit s2 and the opening 425. The signal path SP may operate as a loop antenna of NFC communication. The NFC IC 550 electrically coupled to the first and second points p1 and p2 may provide RF signals (e.g., power feed). According to one embodiment, the NFC IC 550 may be connected to the first and second points p1 and p2 via inductor(s) having high inductances. Further, at least one inductor and/or at least one low-pass filter may be provided on the signal path SP.

According to various embodiments of the present disclosure, at least parts of the side member 501 (e.g., the side frame) and the second plate 420 (e.g., the rear cover) that constitute the housing 400 of the electronic device are used as an antenna. Accordingly, radiation patterns generated by this antenna are formed on the rear surface of the electronic device as well as at the upper portion of the electronic device. It is therefore possible to perform wireless communication with higher accuracy.

What is claimed is:

1. An electronic device comprising:
a housing including a first plate, a second plate facing in a reverse direction of the first plate, and a side member surrounding the first and second plates, wherein at least a portion of the second plate is made of a conductive material;
a touch screen display exposed through the first plate;
a processor disposed between the first and second plates; and
a wireless communication circuit disposed between the first and second plates and electrically connected to the processor,
wherein the second plate has a rectangular shape including:
a first side having a first length and extending in a first direction;
a second side having a second length greater than the first length and extending in a second direction perpendicular to the first direction;
a third side having the first length and extending parallel with the first side in the first direction; and
a fourth side having the second length and extending parallel with the second side in the second direction,
wherein the second plate includes:
a first slit disposed between the first and third sides and extending in the first direction from a first position on the second side, as viewed in a top view of the second plate;
a second slit aligned with the first slit, extending in the first direction from a second position on the fourth side, and spaced apart from the first slit, as viewed in the top view of the second plate;
an opening formed in a portion of the second plate between the third side and at least one of the first and second slits, as viewed in the top view of the second plate;
a third slit extending from the second slit to the opening, as viewed in the top view of the second plate; and
a non-conductive material filling the first slit, the second slit, the third slit, and/or the opening, and
wherein the side member includes:
a conductive region extending from the first position to the second position along a portion of the second side, the first side, and a portion of the fourth side;
a fourth slit disposed at the first position corresponding to the first slit of the second plate; and
a fifth slit disposed at the second position corresponding to the second slit of the second plate.

2. The electronic device of claim 1, wherein:
a first terminal of the wireless communication circuit is electrically connected to the second plate at a first point disposed adjacent to the fourth side and between the first side and the second slit, and
a second terminal of the wireless communication circuit is electrically connected to the second plate at a second point disposed adjacent to the fourth side and between the third side and the second slit.

3. The electronic device of claim 2, wherein the wireless communication circuit includes a near field communication (NFC) integrated circuit (IC) that supplies a radio frequency (RF) signal to the first and second points.

4. The electronic device of claim 3, wherein when the wireless communication circuit supplies the RF signal to the first and second points, a signal path is formed from the first point, through a portion of the second plate between the first and second slits, around a circumference of the opening, and to the second point.

5. The electronic device of claim 4, further comprising:
at least one inductor electrically connected between the NFC IC and at least one of the first and second points.

6. The electronic device of claim 1, wherein a first terminal of the wireless communication circuit is electrically connected to the second plate at a first point disposed adjacent to the third slit and between the second slit and the opening.

7. The electronic device of claim 6, further comprising:
a wound coil having an axis perpendicular to the second plate and disposed in the housing adjacent the opening.

8. The electronic device of claim 1, wherein the wireless communication circuit is configured to support a near field communication (NFC) protocol.

9. An electronic device comprising:
a housing including a first plate, a second plate facing in a reverse direction of the first plate, and a side member surrounding the first and second plates, wherein at least a portion of the second plate is made of a conductive material;
a touch screen display exposed through the first plate;
a processor disposed between the first and second plates; and
a wireless communication circuit disposed between the first and second plates and electrically connected to the processor,
wherein the second plate has a rectangular shape including:
a first side having a first length and extending in a first direction;
a second side having a second length greater than the first length and extending in a second direction perpendicular to the first direction;
a third side having the first length and extending parallel with the first side in the first direction; and
a fourth side having the second length and extending parallel with the second side in the second direction,
wherein the second plate includes:
a first slit disposed between the first and third sides and extending in the first direction from a first position on the second side, as viewed in a top view of the second plate;
a second slit aligned with the first slit, extending in the first direction from a second position on the fourth side, and spaced apart from the first slit, as viewed in the top view of the second plate;
an opening formed in a portion of the second plate between the first side and at least one of the first and second slits, as viewed in the top view of the second plate; and
a non-conductive material filling the first slit, the second slit, and/or the opening, and
wherein the side member includes:
a conductive region extending from the first position to the second position along a portion of the second side, the first side, and a portion of the fourth side;
a third slit disposed at the first position corresponding to the first slit of the second plate; and
a fourth slit disposed at the second position corresponding to the second slit of the second plate.

10. The electronic device of claim 9, wherein:
a first terminal of the wireless communication circuit is electrically connected to the second plate at a first point disposed between the opening and the second slit, and
a second terminal of the wireless communication circuit is electrically connected to the second plate at a second point disposed adjacent to the fourth side and between the third side and the second slit.

11. The electronic device of claim 10, wherein when the wireless communication circuit supplies a RF signal to the first and second points, a signal path is formed from the first point, through a first portion of the second plate surrounding the opening, a second portion of the second plate between the first side and the second slit, a third portion of the second plate between the first and second slits, a fourth portion of the second plate between the second slit and the third side, and to the second point.

12. An electronic device comprising:
a housing including a first plate, a second plate facing in a reverse direction of the first plate, and a side member surrounding the first and second plates, wherein at least a portion of the second plate is made of a conductive material;
a touch screen display exposed through the first plate;
a processor disposed between the first and second plates; and
a wireless communication circuit disposed between the first and second plates and electrically connected to the processor,
wherein the second plate has a rectangular shape including:
a first side having a first length and extending in a first direction;
a second side having a second length greater than the first length and extending in a second direction perpendicular to the first direction;
a third side having the first length and extending parallel with the first side in the first direction; and
a fourth side having the second length and extending parallel with the second side in the second direction,
wherein the second plate includes:
a conductive region extending between the first and third sides and overlapping a first portion of the second and fourth sides, as viewed in a top view of the second plate;
a non-conductive region disposed between a top surface of the side member and a top of the conductive region of the second plate, as viewed in the top view of the second plate;
an opening formed in the conductive region; and
a slit extending from the non-conductive region to the opening, as viewed in the top view of the second plate, and wherein the side member includes:
a first conductive part extending along the first side of the second plate;
a second conductive part extending along the first and second sides of the second plate;
a third conductive part extending along the first and fourth sides of the second plate;
a first non-conductive part formed between and electrically separating the first and second conductive parts; and
a second non-conductive part formed between and electrically separating the first and third conductive parts.

13. The electronic device of claim 12, wherein:
a first terminal of the wireless communication circuit is electrically connected to the second conductive part of the side member at a first point adjacent to the first non-conductive part, and
a first terminal of the wireless communication circuit is electrically connected to the third conductive part of the side member at a second point adjacent to the second non-conductive part, and
the second and third conductive parts of the side member are electrically connected to the conductive region of the second plate.

14. The electronic device of claim 13, wherein the conductive region of the second plate is in contact with the second and third conductive parts of the side member.

15. The electronic device of claim 13, further comprising:
a non-conductive elongated slit formed along all four sides of the second plate between the second plate and the side member;
a first connecting part electrically connecting the conductive region of the second plate and the second conductive part of the side member across the elongated slit; and
a second connecting part electrically connecting the conductive region of the second plate and the third conductive part of the side member across the elongated slit.

16. An electronic device comprising:
a housing including a first plate, a second plate facing in a reverse direction of the first plate, and a side member surrounding the first and second plates, wherein at least a portion of the second plate is made of a conductive material;
a touch screen display exposed through the first plate;
a processor disposed between the first and second plates; and
a wireless communication circuit disposed between the first and second plates and electrically connected to the processor,
wherein the second plate has a rectangular shape including:
a first side having a first length and extending in a first direction;
a second side having a second length greater than the first length and extending in a second direction perpendicular to the first direction;
a third side having the first length and extending parallel with the first side in the first direction; and
a fourth side having the second length and extending parallel with the second side in the second direction,
wherein the second plate includes:
a conductive region;
a non-conductive region surrounding the conductive region, as viewed in a top view of the second plate; and
an opening formed in the conductive region, and
wherein the side member includes:
a first conductive part extending along the first side of the second plate;
a second conductive part extending along the first, second and third sides of the second plate;
a third conductive part extending along the third side of the second plate;
a fourth conductive part extending along the third, fourth and first sides of the second plate;
a first non-conductive part formed between and electrically separating the first and second conductive parts; and
a second non-conductive part formed between and electrically separating the first and fourth conductive parts.

17. The electronic device of claim 16, further comprising:
a fifth conductive part electrically connecting the second and third conductive parts; and
a sixth conductive part electrically connecting the third and fourth conductive parts.

18. The electronic device of claim 17, wherein at least one of the fifth and sixth conductive parts includes an inductor.

19. The electronic device of claim 17, wherein:
a first terminal of the wireless communication circuit is electrically connected to the second plate at a first point disposed at one end of the second conductive part adjacent to the first non-conductive part; and
a second terminal of the wireless communication circuit is electrically connected to the second plate at a second point disposed at one end of the fourth conductive part adjacent to the second non-conductive part.

20. The electronic device of claim 19, wherein when the wireless communication circuit supplies a RF signal to the first and second points, a signal path is formed from the first point, through the second conductive part, the fifth conductive part, the third conductive part, the sixth conductive part, the fourth conductive part, and to the second point.

* * * * *